United States Patent
Vehr et al.

(10) Patent No.: US 11,660,934 B2
(45) Date of Patent: May 30, 2023

(54) STARTUP CONTROL SYSTEMS AND METHODS TO REDUCE FLOODED STARTUP CONDITIONS

(71) Applicant: Emerson Climate Technologies, Inc., Sidney, OH (US)

(72) Inventors: Shawn W. Vehr, Troy, OH (US); Joseph J. Rozsnaki, Troy, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 16 days.

(21) Appl. No.: 17/354,847

(22) Filed: Jun. 22, 2021

(65) Prior Publication Data

US 2021/0316596 A1 Oct. 14, 2021

Related U.S. Application Data

(63) Continuation of application No. 16/798,040, filed on Feb. 21, 2020, now Pat. No. 11,046,152, which is a
(Continued)

(51) Int. Cl.
*B60H 1/32* (2006.01)
*F04B 35/04* (2006.01)
(Continued)

(52) U.S. Cl.
CPC ......... *B60H 1/3205* (2013.01); *B60H 1/3216* (2013.01); *F04B 35/04* (2013.01);
(Continued)

(58) Field of Classification Search
CPC ................ B60H 1/3205; B60H 1/3216; B60H 2001/3238; B60H 2001/3258;
(Continued)

(56) References Cited

U.S. PATENT DOCUMENTS 2,895,308 A  7/1959  Alward
4,043,144 A  8/1977  Klotz et al.
(Continued)

FOREIGN PATENT DOCUMENTS

CN  1077687 A  10/1993
CN  2273668 Y  2/1998
(Continued)

OTHER PUBLICATIONS

U.S. Appl. No. 15/583,424, filed May 1, 2017, Kolpe.
(Continued)

*Primary Examiner* — Joseph F Trpisovsky
(74) *Attorney, Agent, or Firm* — Harness, Dickey & Pierce, P.L.C.

(57) ABSTRACT

A control module for a refrigeration system includes a startup mode control module that receives an off time of a compressor and an ambient temperature, determines whether the off time and the ambient temperature indicate that the compressor is in a flooded condition, and selects, based on the determination, between a normal startup mode and a flooded startup mode. A compressor control module transitions from the flooded startup mode to the normal startup mode after a predetermined period associated with operating in the flooded startup mode and operates the compressor at a first speed in the normal startup mode and operates the compressor at a second speed less than the first speed in the flooded startup mode.

15 Claims, 11 Drawing Sheets

Related U.S. Application Data continuation of application No. 15/635,688, filed on Jun. 28, 2017, now Pat. No. 10,569,620.

(60) Provisional application No. 62/356,647, filed on Jun. 30, 2016.

(51) Int. Cl.

| | | |
|---|---|---|
| *F04B 49/02* | (2006.01) | |
| *F04B 49/20* | (2006.01) | |
| *F04C 28/06* | (2006.01) | |
| *F04C 28/08* | (2006.01) | |
| *F25B 49/02* | (2006.01) | |
| *B60H 1/00* | (2006.01) | |
| *F04C 18/02* | (2006.01) | |

(52) U.S. Cl.
CPC .............. *F04B 49/02* (2013.01); *F04B 49/20* (2013.01); *F04C 28/06* (2013.01); *F04C 28/08* (2013.01); *F25B 49/022* (2013.01); *B60H 1/005* (2013.01); *B60H 2001/3238* (2013.01); *B60H 2001/3258* (2013.01); *B60H 2001/3272* (2013.01); *F04B 2207/03* (2013.01); *F04C 18/0215* (2013.01); *F25B 2500/26* (2013.01); *F25B 2500/28* (2013.01); *F25B 2500/31* (2013.01); *F25B 2600/0252* (2013.01)

(58) Field of Classification Search
CPC ...... B60H 2001/3272; B60H 2001/327; F25B 49/022; F25B 2500/26; F25B 2500/28; F25B 2500/31; F25B 2600/0252; F04B 35/04; F04B 49/02; F04B 49/20; F04B 2207/03; F04C 28/06; F04C 28/08
See application file for complete search history.

(56) References Cited

U.S. PATENT DOCUMENTS

| | | |
|---|---|---|
| 4,328,855 A | 5/1982 | Iwata et al. |
| 4,616,484 A | 10/1986 | Mehdi et al. |
| 4,658,593 A | 4/1987 | Stenvinkel |
| 5,265,435 A | 11/1993 | Richardson |
| 5,395,224 A | 3/1995 | Caillat et al. |
| 5,651,260 A | 7/1997 | Goto et al. |
| 5,929,609 A | 7/1999 | Joy et al. |
| 6,071,100 A | 6/2000 | Yamada et al. |
| 6,074,186 A | 6/2000 | Lifson et al. |
| 6,230,507 B1 | 5/2001 | Ban et al. |
| 6,411,059 B2 | 6/2002 | Frugier et al. |
| 6,422,843 B1 | 7/2002 | Sun et al. |
| 6,487,869 B1 | 12/2002 | Sulc et al. |
| 6,543,245 B1 | 4/2003 | Waldschmidt et al. |
| 6,622,505 B2 | 9/2003 | Anderson et al. |
| 6,640,564 B2 | 11/2003 | Yamashita et al. |
| 6,889,762 B2 | 5/2005 | Zeigler et al. |
| 7,040,877 B2 | 5/2006 | Bergman et al. |
| 7,174,736 B2 | 2/2007 | Chen et al. |
| 7,398,653 B2 | 7/2008 | Oomura et al. |
| 7,591,143 B2 | 9/2009 | Zeigler et al. |
| 7,591,303 B2 | 9/2009 | Zeigler et al. |
| 7,614,859 B2 | 11/2009 | Sawai et al. |
| 7,699,591 B2 | 4/2010 | Futagami et al. |
| 7,832,221 B2 | 11/2010 | Wijaya et al. |
| 7,963,117 B2 | 6/2011 | Allen et al. |
| 7,966,839 B2 | 6/2011 | McEnaney et al. |
| 8,123,490 B2 | 2/2012 | Goto et al. |
| 8,161,758 B2 | 4/2012 | Bailey et al. |
| 8,181,478 B2 | 5/2012 | Ignatiev |
| 8,342,810 B2 | 1/2013 | Koyama |
| 8,453,722 B2 | 6/2013 | Zeigler et al. |
| 8,534,082 B2 | 9/2013 | Price et al. |
| 8,672,642 B2 | 3/2014 | Tolbert, Jr. et al. |
| 8,723,458 B1 | 5/2014 | Chambers |
| 8,734,125 B2 | 5/2014 | McSweeney et al. |
| 8,769,982 B2 | 7/2014 | Ignatiev et al. |
| 8,935,933 B1 | 1/2015 | Koelsch |
| 9,126,544 B2 | 9/2015 | Larson et al. |
| 9,194,393 B2 | 11/2015 | Pham |
| 9,212,838 B2 | 12/2015 | Wendrock et al. |
| 9,557,100 B2 | 1/2017 | Chopko et al. |
| 9,688,181 B2 | 6/2017 | Dutta et al. |
| 9,689,598 B2 | 6/2017 | Truckenbrod et al. |
| 10,059,172 B2 | 8/2018 | Liu et al. |
| 10,118,503 B2 | 11/2018 | Newman et al. |
| 10,180,281 B2 | 1/2019 | Olaleye |
| 10,230,236 B2 | 3/2019 | Schumacher et al. |
| 10,240,847 B1 | 3/2019 | Thomas, Jr. |
| 10,300,766 B2 | 5/2019 | Vehr et al. |
| 10,315,495 B2 | 6/2019 | Vehr et al. |
| 10,328,771 B2 | 6/2019 | Vehr et al. |
| 10,414,241 B2 | 9/2019 | Vehr et al. |
| 10,532,632 B2 | 1/2020 | Vehr et al. |
| 10,562,377 B2 | 2/2020 | Vehr et al. |
| 10,569,620 B2 | 2/2020 | Vehr et al. |
| 10,641,269 B2 | 5/2020 | Ma et al. |
| 10,654,341 B2 | 5/2020 | Vehr et al. |
| 10,828,963 B2 | 11/2020 | Vehr et al. |
| 2003/0077179 A1 | 4/2003 | Collins et al. |
| 2003/0106332 A1 | 6/2003 | Okamoto et al. |
| 2003/0118450 A1 | 6/2003 | Iwanami et al. |
| 2003/0136138 A1 | 7/2003 | Tsuboi et al. |
| 2003/0201097 A1 | 10/2003 | Zeigler et al. |
| 2004/0231831 A1 | 11/2004 | Houck et al. |
| 2006/0151163 A1 | 7/2006 | Zeigler et al. |
| 2007/0052241 A1 | 3/2007 | Pacy |
| 2007/0056300 A1 | 3/2007 | Crane |
| 2007/0131408 A1 | 6/2007 | Zeigler et al. |
| 2007/0151273 A1 | 7/2007 | Nelson et al. |
| 2007/0209378 A1 | 9/2007 | Larson |
| 2008/0011007 A1 | 1/2008 | Larson et al. |
| 2008/0014852 A1 | 1/2008 | Mielke et al. |
| 2008/0034773 A1 | 2/2008 | Karapetian |
| 2009/0011007 A1 | 1/2009 | Meier et al. |
| 2010/0011788 A1 | 1/2010 | Lifson et al. |
| 2010/0076664 A1 | 3/2010 | Monros |
| 2010/0080713 A1 | 4/2010 | Douglas et al. |
| 2010/0178175 A1 | 7/2010 | Koyama |
| 2010/0180614 A1 | 7/2010 | Larson et al. |
| 2010/0242510 A1 | 9/2010 | Kadle et al. |
| 2011/0083450 A1 | 4/2011 | Turner et al. |
| 2011/0110791 A1 | 5/2011 | Donnat et al. |
| 2011/0265506 A1 | 11/2011 | Alston |
| 2012/0017618 A1 | 1/2012 | Price et al. |
| 2012/0152511 A1 | 6/2012 | Chang et al. |
| 2012/0198869 A1 | 8/2012 | Morita et al. |
| 2012/0262881 A1 | 10/2012 | Onimaru et al. |
| 2012/0290161 A1 | 11/2012 | Takeda et al. |
| 2013/0054072 A1 | 2/2013 | Christen et al. |
| 2013/0199223 A1 | 8/2013 | Brooke et al. |
| 2013/0240043 A1 | 9/2013 | Pham et al. |
| 2013/0248165 A1 | 9/2013 | Kandasamy |
| 2013/0333398 A1 | 12/2013 | Wendrock et al. |
| 2014/0020097 A1 | 1/2014 | Riou |
| 2014/0023519 A1 | 1/2014 | Li |
| 2014/0026599 A1 | 1/2014 | Rusignuolo et al. |
| 2014/0060097 A1 | 3/2014 | Perreault |
| 2014/0116673 A1 | 5/2014 | Kang et al. |
| 2014/0137580 A1 | 5/2014 | Peyaud et al. |
| 2014/0208789 A1 | 7/2014 | Lombardo et al. |
| 2014/0308138 A1 | 10/2014 | Pham |
| 2014/0311180 A1 | 10/2014 | Kawakami et al. |
| 2014/0338376 A1 | 11/2014 | Carpenter et al. |
| 2015/0013361 A1 | 1/2015 | Senf, Jr. et al. |
| 2015/0121923 A1 | 5/2015 | Rusignuolo et al. |
| 2015/0188360 A1 | 7/2015 | Doane et al. |
| 2015/0224852 A1 | 8/2015 | Wiedemann et al. |
| 2015/0314671 A1 | 11/2015 | Rajtmajer et al. |
| 2015/0345829 A1 | 12/2015 | Chen |
| 2015/0352925 A1 | 12/2015 | Olyleye et al. |
| 2016/0033190 A1 | 2/2016 | Kim |
| 2016/0061504 A1 | 3/2016 | Penn, II et al. |
| 2016/0144764 A1 | 5/2016 | Dutta et al. |

(56) References Cited

U.S. PATENT DOCUMENTS

| | | |
|---|---|---|
| 2016/0144765 A1 | 5/2016 | Viegas et al. |
| 2016/0159339 A1 | 6/2016 | Cho et al. |
| 2016/0334154 A1 | 11/2016 | Srichai et al. |
| 2016/0361975 A1 | 12/2016 | Blatchley et al. |
| 2017/0100987 A1 | 4/2017 | Chopko et al. |
| 2017/0151859 A1 | 6/2017 | Dykes et al. |
| 2017/0203633 A1 | 7/2017 | High et al. |
| 2017/0321678 A1 | 11/2017 | Kolpe |
| 2017/0321679 A1 | 11/2017 | Devanawar et al. |
| 2017/0370626 A1 | 12/2017 | Ohyama et al. |
| 2018/0001731 A1 | 1/2018 | Vehr et al. |
| 2018/0001738 A1 | 1/2018 | Vehr et al. |
| 2018/0001739 A1 | 1/2018 | Vehr et al. |
| 2018/0001740 A1 | 1/2018 | Vehr et al. |
| 2018/0001742 A1 | 1/2018 | Vehr et al. |
| 2018/0001744 A1 | 1/2018 | Vehr et al. |
| 2018/0001745 A1 | 1/2018 | Vehr et al. |
| 2018/0001746 A1 | 1/2018 | Vehr et al. |
| 2018/0041137 A1 | 2/2018 | Iwata et al. |
| 2018/0056754 A1 | 3/2018 | Choi et al. |
| 2018/0073789 A1 | 3/2018 | Connell et al. |
| 2018/0087816 A1 | 3/2018 | Lee et al. |
| 2018/0100682 A1 | 4/2018 | Nilsen et al. |
| 2018/0222278 A1 | 8/2018 | Mizuma |
| 2018/0257458 A1 | 9/2018 | Gergis et al. |
| 2018/0264951 A1 | 9/2018 | Kooi |
| 2018/0320956 A1 | 11/2018 | Schumacher et al. |
| 2019/0009648 A1 | 1/2019 | Connell et al. |
| 2019/0030984 A1 | 1/2019 | Zeigler et al. |
| 2019/0047357 A1 | 2/2019 | Skingsley |
| 2019/0077227 A1 | 3/2019 | Okada et al. |
| 2019/0084378 A1 | 3/2019 | Yamada et al. |
| 2019/0092123 A1 | 3/2019 | Kim |
| 2019/0275866 A1 | 9/2019 | Vehr et al. |
| 2020/0114733 A1 | 4/2020 | Vehr et al. |
| 2020/0189360 A1 | 6/2020 | Vehr et al. |

FOREIGN PATENT DOCUMENTS

| | | |
|---|---|---|
| CN | 2538582 Y | 3/2003 |
| CN | 2626754 Y | 7/2004 |
| CN | 1239869 C | 2/2006 |
| CN | 101043141 A | 9/2007 |
| CN | 101251096 A | 8/2008 |
| CN | 101319968 A | 12/2008 |
| CN | 101566382 A | 10/2009 |
| CN | 201516800 U | 6/2010 |
| CN | 101934755 A | 1/2011 |
| CN | 201914055 U | 8/2011 |
| CN | 102338013 A | 2/2012 |
| CN | 102627064 A | 8/2012 |
| CN | 202371848 U | 8/2012 |
| CN | 102748889 A | 10/2012 |
| CN | 102837634 A | 12/2012 |
| CN | 103292418 A | 9/2013 |
| CN | 103900251 A | 7/2014 |
| CN | 103994618 A | 8/2014 |
| CN | 104477004 A | 4/2015 |
| CN | 204646671 U | 9/2015 |
| CN | 105564254 A | 5/2016 |
| JP | H0448179 A | 2/1992 |
| JP | 2000283622 A | 10/2000 |
| JP | 2002130891 A | 5/2002 |
| JP | 2002286305 A | 10/2002 |
| JP | 2002318048 A | 10/2002 |
| JP | 2004123022 A | 4/2004 |
| JP | 2004156859 A | 6/2004 |
| JP | 2006084102 A | 3/2006 |
| JP | 4354372 B2 | 10/2009 |
| JP | 2012149848 A | 8/2012 |
| JP | 2015038388 A | 2/2015 |
| KR | 101462575 B1 | 11/2014 |
| WO | WO-0049349 A1 | 8/2000 |
| WO | WO-2009011629 A1 | 1/2009 |
| WO | WO-2013165534 A1 | 11/2013 |
| WO | WO-2015090191 A1 | 6/2015 |
| WO | WO-2016147022 A1 | 9/2016 |

OTHER PUBLICATIONS

U.S. Appl. No. 15/583,491, filed May 1, 2017, Devanawar et al.
International Search Report regarding International Application No. PCT/US2017/040291, dated Sep. 21, 2017.
Written Opinion of the International Searching Authority regarding International Application No. PCT/US2017/040291, dated Sep. 21, 2017.
International Search Report regarding International Application No. PCT/US2017/040326, dated Sep. 21, 2017.
Written Opinion of the International Searching Authority regarding International Application No. PCT/US2017/040326, dated Sep. 21, 2017.
International Search Report regarding International Application No. PCT/US2017/040272, dated Sep. 22, 2017.
Written Opinion of the International Searching Authority regarding International Application No. PCT/US2017/040272, dated Sep. 22, 2017.
International Search Report regarding International Application No. PCT/US2017/040236, dated Oct. 16, 2017.
Written Opinion of the International Searching Authority regarding International Application No. PCT/US2017/040236, dated Oct. 16, 2017.
International Search Report regarding International Application No. PCT/US2017/040200, dated Oct. 16, 2017.
Written Opinion of the International Searching Authority regarding International Application No. PCT/US2017/040200, dated Oct. 16, 2017.
International Search Report regarding International Application No. PCT/US2017/040344, dated Oct. 18, 2017.
Written Opinion of the International Searching Authority regarding International Application No. PCT/US2017/040344, dated Oct. 18, 2017.
International Search Report regarding International Application No. PCT/US2017/040193, dated Oct. 30, 2017.
Written Opinion of the International Searching Authority regarding International Application No. PCT/US2017/040193, dated Oct. 30, 2017.
International Search Report regarding International Application No. PCT/US2017/040310, dated Oct. 30, 2017.
Written Opinion of the International Searching Authority regarding International Application No. PCT/US2017/040310, dated Oct. 30, 2017.
Election/Restriction Requirement regarding U.S. Appl. No. 15/635,483, dated Apr. 25, 2018.
Election/Restriction Requirement regarding U.S. Appl. No. 15/635,760, dated May 30, 2018.
Non-Final Office Action regarding U.S. Appl. No. 15/635,483, dated Aug. 1, 2018.
Non-Final Office Action regarding U.S. Appl. No. 15/635,760 dated Sep. 14, 2018.
Applicant-Initiated Interview Summary regarding U.S. Appl. No. 15/635,483 dated Oct. 18, 2018.
Non-Final Office Action regarding U.S. Appl. No. 15/635,249 dated Dec. 3, 2018.
Han-2014: "A comparative study of commercial lithium ion battery cycle life in electrical vehicle: Aging mechanism identification", Xuebing Han et al., Journal of Power Sources 251 (2014) 38-54.
Applicant-Initiated Interview Summary regarding U.S. Appl. No. 15/635,760 dated Dec. 5, 2018.
Election/Restriction Requirement regarding U.S. Appl. No. 15/635,688, dated Dec. 6, 2018.
Non-Final Office Action regarding U.S. Appl. No. 15/635,779 dated Dec. 26, 2018.
Applicant-Initiated Interview Summary regarding U.S. Appl. No. 15/635,249 dated Dec. 28, 2018.
Non-Final Office Action regarding U.S. Appl. No. 15/635,372 dated Jan. 18, 2019.

(56) References Cited

OTHER PUBLICATIONS

Lyon: "An All Electric Refrigerated Truck for Nestlé Switzerland," Renault Trucks Deliver Press Release, Corporate Communications Department; Jun. 2012; 2 Pages.
Vijayenthiran, Viknesh "Mercedes beats Tesla to electric truck," Motor Authority; FoxNews.com; Published Oct. 11, 2016 <https://www.foxnews.com/auto/mercedes-beats-tesla-to-electric-truck>.
Applicant-Initiated Interview Summary regarding U.S. Appl. No. 15/635,779 dated Feb. 20, 2019.
Notice of Allowance regarding U.S. Appl. No. 15/635,760 dated Feb. 20, 2019.
Notice of Allowance regarding U.S. Appl. No. 15/635,483 dated Jan. 10, 2019.
Notice of Allowance regarding U.S. Appl. No. 15/635,249, dated Mar. 29, 2019.
Notice of Allowance regarding U.S. Appl. No. 15/635,760, dated Apr. 2, 2019.
Notice of Allowance regarding U.S. Appl. No. 15/635,239, dated Mar. 15, 2019.
USPTO Office Communication forwarding Applicant-Initiated Interview Summary and Response to 312 Amendment regarding U.S. Appl. No. 15/635,483 dated Apr. 1, 2019.
Non-Final Office Action regarding U.S. Appl. No. 15/635,688 dated May 20, 2019.
Non-Final Office Action regarding U.S. Appl. No. 15/635,444 dated Jun. 4, 2019.
Notice of Allowance regarding U.S. Appl. No. 15/635,372 dated May 31, 2019.
Notice of Allowance regarding U.S. Appl. No. 15/635,249, dated Jun. 10, 2019.
Final Office Action regarding U.S. Appl. No. 15/635,779 dated Jul. 3, 2019.
Notice of Allowance regarding U.S. Appl. No. 15/635,372 dated Jul. 12, 2019.
Applicant-Initiated Interview Summary regarding U.S. Appl. No. 15/635,688 dated Aug. 2, 2019.
Applicant-Initiated Interview Summary regarding U.S. Appl. No. 15/635,444 dated Aug. 8, 2019.
Notice of Allowance regarding U.S. Appl. No. 15/635,779 dated Sep. 23, 2019.
Non-Final Office Action regarding U.S. Appl. No. 16/420,800 dated Oct. 10, 2019.
Notice of Allowance regarding U.S. Appl. No. 15/635,688 dated Oct. 17, 2019.
Final Office Action regarding U.S. Appl. No. 15/635,444 dated Oct. 22, 2019..
Notice of Allowance regarding U.S. Appl. No. 15/635,249 dated Nov. 1, 2019.
Applicant-Initiated Interview Summary regarding U.S. Appl. No. 15/635,444, dated Dec. 6, 2019.
Notice of Allowance regarding U.S. Appl. No. 16/420,800 dated Feb. 4, 2020.
Search Report regarding European Patent Application No. 17821379.9, dated Feb. 4, 2020.
European Office Action regarding application EP 17821379.9, dated Feb. 21, 2020.
Search Report regarding European Patent Application No. 17821351.8, dated Jan. 27, 2020.
Office Action regarding Japanese Patent Application No. 2018-569031, dated Jan. 14, 2020. Translation provided by Shiga International Patent Office.
Search Report regarding European Patent Application No. 17821356.7, dated Jan. 17, 2020.
Office Action regarding Chinese Patent Application No. 201780047573.1, dated Apr. 26, 2020. Translation provided by Unitalen Attorneys at Law.
Notice of Allowance regarding U.S. Appl. No. 15/635,444, dated Jul. 1, 2020.
Office Action regarding U.S. Appl. No. 16/798,040, dated Nov. 6, 2020.
Office Action regarding Chinese Patent Application No. 201780048012.3, dated Oct. 28, 2020. Translation provided by Unitalen Attorneys at Law.
Office Action regarding Chinese Patent Application No. 201780047573.1, dated Dec. 25, 2020. Translation provided by Unitalen Attorneys at Law.
Office Action regarding Chinese Patent Application No. 201780048013.8, dated Jan. 5, 2021. Translation provided by Unitalen Attorneys at Law.
Advisory Action regarding U.S. Appl. No. 15/635,444, dated Dec. 19, 2019.
Office Action regarding Chinese Patent Application No. 201780047944.6, dated Apr. 24, 2020. Translation provided by Unitalen Attorneys at Law.
Office Action regarding Chinese Patent Application No. 201780046805.1, dated Jul. 9, 2020. Translation provided by Unitalen Attorneys at Law.
Office Action regarding Chinese Patent Application No. 201780048013.8, dated Jun. 22, 2020. Translation provided by Unitalen Attorneys at Law.
Office Action regarding Chinese Patent Application No. 201780051811.6, dated Oct. 26, 2020. Translation provided by Unitalen Attorneys at Law.
Notice of Allowance regarding U.S. Appl. No. 16/568,964, dated Jan. 29, 2021.
Notice of Allowance regarding U.S. Appl. No. 16/798,040, dated Feb. 24, 2021.
Office Action regarding Chinese Patent Application No. 201780046805.1, dated Mar. 23, 2021. Translation provided by Unitalen Attorneys at Law.
Non-Final Office Action regarding U.S. Appl. No. 16/709,143 dated May 14, 2021.
First Chinese Office Action regarding Application No. 201780048569.7 dated Jul. 1, 2021. English translation provided by Unitalen Attorneys at Law.
Translation of Notification of Grant of Patent for Invention corresponding to Chinese Application No. 201780047224.X dated Sep. 28, 2021, 6 pages.

STARTUP CONTROL SYSTEMS AND METHODS TO REDUCE FLOODED STARTUP CONDITIONS

CROSS-REFERENCE TO RELATED APPLICATIONS

The present disclosure is a continuation of U.S. patent application Ser. No. 16/798,040 (now U.S. Pat. No. 11,046,152), filed on Feb. 21, 2020, which is a continuation of U.S. patent application Ser. No. 15/635,688 (now U.S. Pat. No. 10,569,620), filed on Jun. 28, 2017, which claims the benefit of U.S. Provisional Application No. 62/356,647, filed on Jun. 30, 2016.

The present application is related to U.S. patent application Ser. No. 15/635,239 (now U.S. Pat. No. 10,328,771), filed Jun. 28, 2017, which claims the benefit of U.S. Provisional Application No. 62/356,608, filed on Jun. 30, 2016, U.S. patent application Ser. No. 15/635,760 (now U.S. Pat. No. 10,315,495), filed Jun. 28, 2017, which claims the benefit of U.S. Provisional Application No. 62/356,620, filed on Jun. 30, 2016, U.S. patent application Ser. No. 15/635,483 (now U.S. Pat. No. 10,300,766), filed Jun. 28, 2017, which claims the benefit of U.S. Provisional Application No. 62/356,626, filed on Jun. 30, 2016, U.S. patent application Ser. No. 15/635,444 (now U.S. Pat. No. 10,828,963), filed Jun. 28, 2017, which claims the benefit of U.S. Provisional Application No. 62/356,631, filed on Jun. 30, 2016, U.S. patent application Ser. No. 15/635,372 (now U.S. Pat. No. 10,414,241), filed Jun. 28, 2017, which claims the benefit of U.S. Provisional Application No. 62/356,639, filed on Jun. 30, 2016, U.S. patent application Ser. No. 15/635,249 (now U.S. Pat. No. 10,562,377), field Jun. 28, 2017, which claims the benefit of U.S. Provisional Application No. 62/356,652, filed on Jun. 30, 2016, and U.S. patent application Ser. No. 15/635,779 (now U.S. Pat. No. 10,532,632), filed Jun. 28, 2017, which claims the benefit of U.S. Provisional Application No. 62/356,666, filed on Jun. 30, 2016. The entire disclosures of the applications referenced above are incorporated herein by reference.

FIELD

The present disclosure relates to vehicles and, more particularly, to refrigeration systems of vehicles.

BACKGROUND

Compressors may be used in a wide variety of industrial and residential applications to circulate refrigerant to provide a desired heating or cooling effect. For example, a compressor may be used to provide heating and/or cooling in a refrigeration system, a heat pump system, a heating, ventilation, and air conditioning (HVAC) system, or a chiller system. These types of systems can be fixed, such as at a building or residence, or can be mobile, such as in a vehicle. Vehicles include land based vehicles (e.g., trucks, cars, trains, etc.), water based vehicles (e.g., boats), air based vehicles (e.g., airplanes), and vehicles that operate over a combination of more than one of land, water, and air.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A refrigeration system includes a startup mode control module that receives an off time of a compressor of the refrigeration system and an ambient temperature, determines whether the off time and the ambient temperature indicate that the compressor is in a flooded condition, and selects, based on the determination, between a normal startup mode and a flooded startup mode. A compressor control module operates the compressor in the normal startup mode in response to the startup mode control module selecting the normal startup mode, operates the compressor in the flooded startup mode in response to the startup mode control module selecting the flooded startup mode, and transitions from the flooded startup mode to the normal startup mode after a predetermined period associated with operating in the flooded startup mode. In some examples, the startup mode control module selectively performs stator heating in response to one or more parameters indicating a flooded condition prior to operating the compressor. The compressor control module operates the compressor at a first speed in the normal startup mode and operates the compressor at a second speed less than the first speed in the flooded startup mode A method of operating a refrigeration system includes receiving an off time of a compressor of the refrigeration system and an ambient temperature, determining whether the off time and the ambient temperature indicate that the compressor is in a flooded condition, selecting, based on the determination, between a normal startup mode and a flooded startup mode, operating the compressor in the normal startup mode in response to selecting the normal startup mode, operating the compressor in the flooded startup mode in response to selecting the flooded startup mode, and transitioning from the flooded startup mode to the normal startup mode after a predetermined period associated with operating in the flooded startup mode. In some examples, stator heating is selectively performed in response to one or more parameters indicating a flooded condition prior to operating the compressor. The compressor is operated at a first speed in the normal startup mode and at a second speed less than the first speed in the flooded startup mode Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1A:
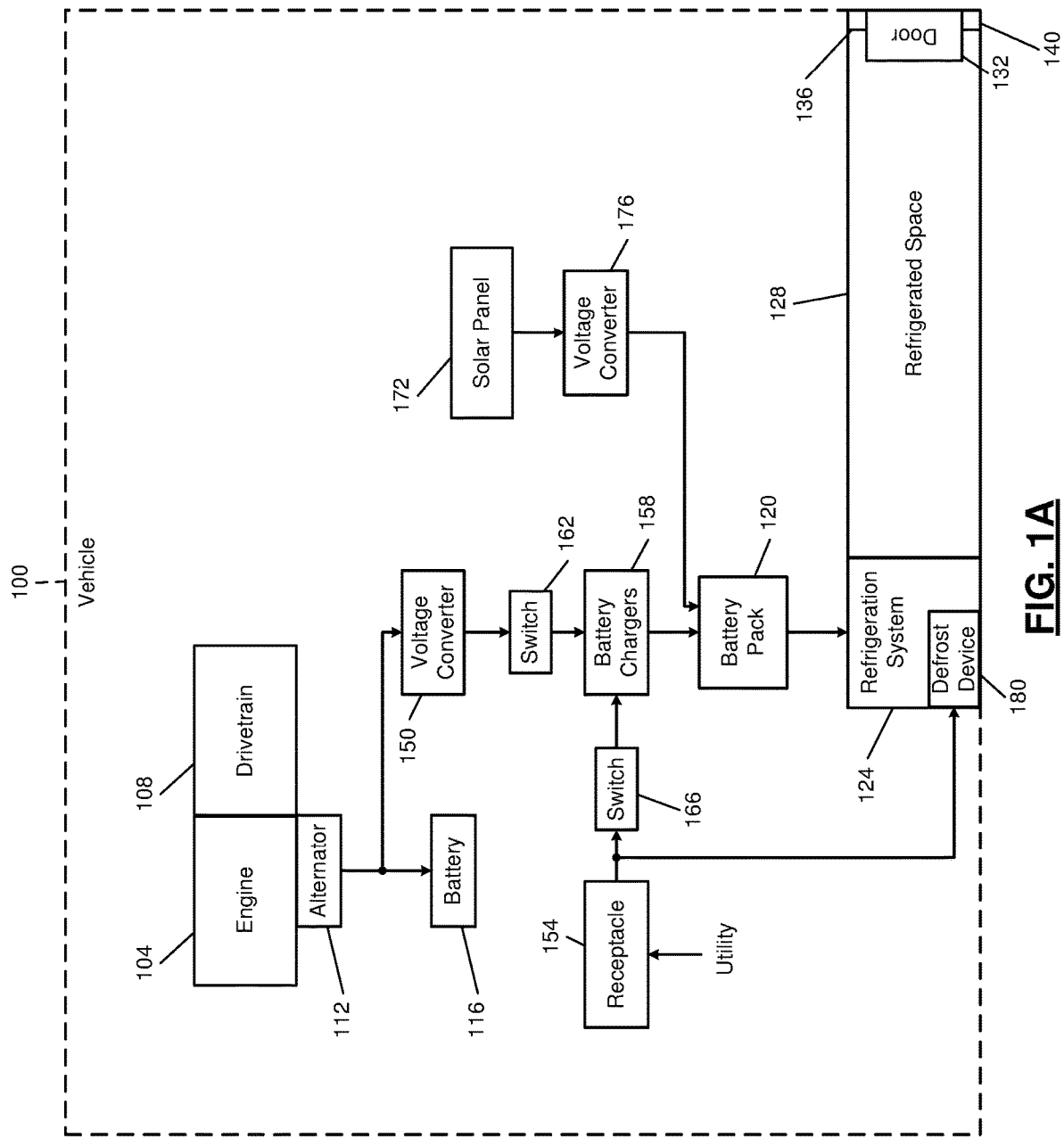
FIGS. 1A and 1B are functional block diagrams of example vehicle systems.

A refrigeration system for a vehicle may include one or more eutectic plates to provide cooling when the vehicle is in use. Eutectic plates contain a solution having a desired freezing point temperature. For example, the solution may include one or more salts to achieve the desired freezing point temperature (e.g., 0 degrees Fahrenheit, 12 degrees Fahrenheit, 35 degrees Fahrenheit, etc.), which may depend upon the types of items being stored and transported within the vehicle. Typically, the eutectic plates are cooled when the vehicle is not in use.

Refrigerant lines are provided to allow flow of refrigerant between and/or within components of the refrigeration system including, but not limited to, a compressor, an evaporator, the eutectic plates, etc. In a refrigeration system that implements eutectic plates, the evaporator includes refrigerant lines having a greater volume and surface area (i.e., relative to a conventional blower evaporator). Accordingly, a refrigeration system including eutectic plates requires a system charge that is significantly greater than (e.g., as much as double) the system charge of a refrigeration system implementing a conventional blower evaporator. The enlarged system charge requires the compressor to pump a greater volume of the refrigerant throughout the refrigeration system, which in turn increases the frequency and severity of various fault conditions, including, but not limited to, flooded startup and liquid floodback situations.

A flooded startup may occur when the compressor is off for an extended period of time and/or when ambient temperatures are below a threshold while the compressor is off. For example, while the compressor is off, a pressure differential within the refrigeration system may cause vapor refrigerant to migrate and collect within the compressor (e.g., in a compressor low side). The vapor refrigerant condenses to liquid and is absorbed by oil within the compressor, causing the oil to be displaced and/or diluted. When the compressor is subsequently turned on, both the liquid refrigerant and the oil are pumped out of the compressor, causing high loads on the compressor and a decrease of the oil level of the compressor. Typically, the oil will return to the compressor only after several minutes of operation. Turning on the compressor in such conditions (i.e., when vapor refrigerant has condensed to liquid and mixed with oil within the compressor) may be referred to as a flooded startup.

Refrigeration systems and methods according to the principles of the present disclosure include a variable speed compressor and implement flooded start logic at startup of the refrigeration system. The flooded start logic predicts flooded startup situations and adjusts operating parameters of the compressor accordingly. For example, the refrigeration system determines whether one or more conditions (e.g., compressor off time, ambient temperature, etc.) indicate that a flooded startup situation is likely to occur, and initiates a normal startup or a flooded startup accordingly. For example, if the refrigeration system determines that a flooded startup is likely, the compressor may be operated at a reduced speed for a predetermined period prior to transitioning to normal startup operating parameters. In this manner, reliability and life of the compressor may be improved. In other examples, the refrigeration system may selectively implement stator heating. For example, stator heating may be applied to prevent flooded startup situations, prior to startup in response to determining that flooded startup is likely, etc. Stator heating may be applied independently of and/or in conjunction with adjustments to the operation of the compressor as described below in more detail.

Figure 1B:
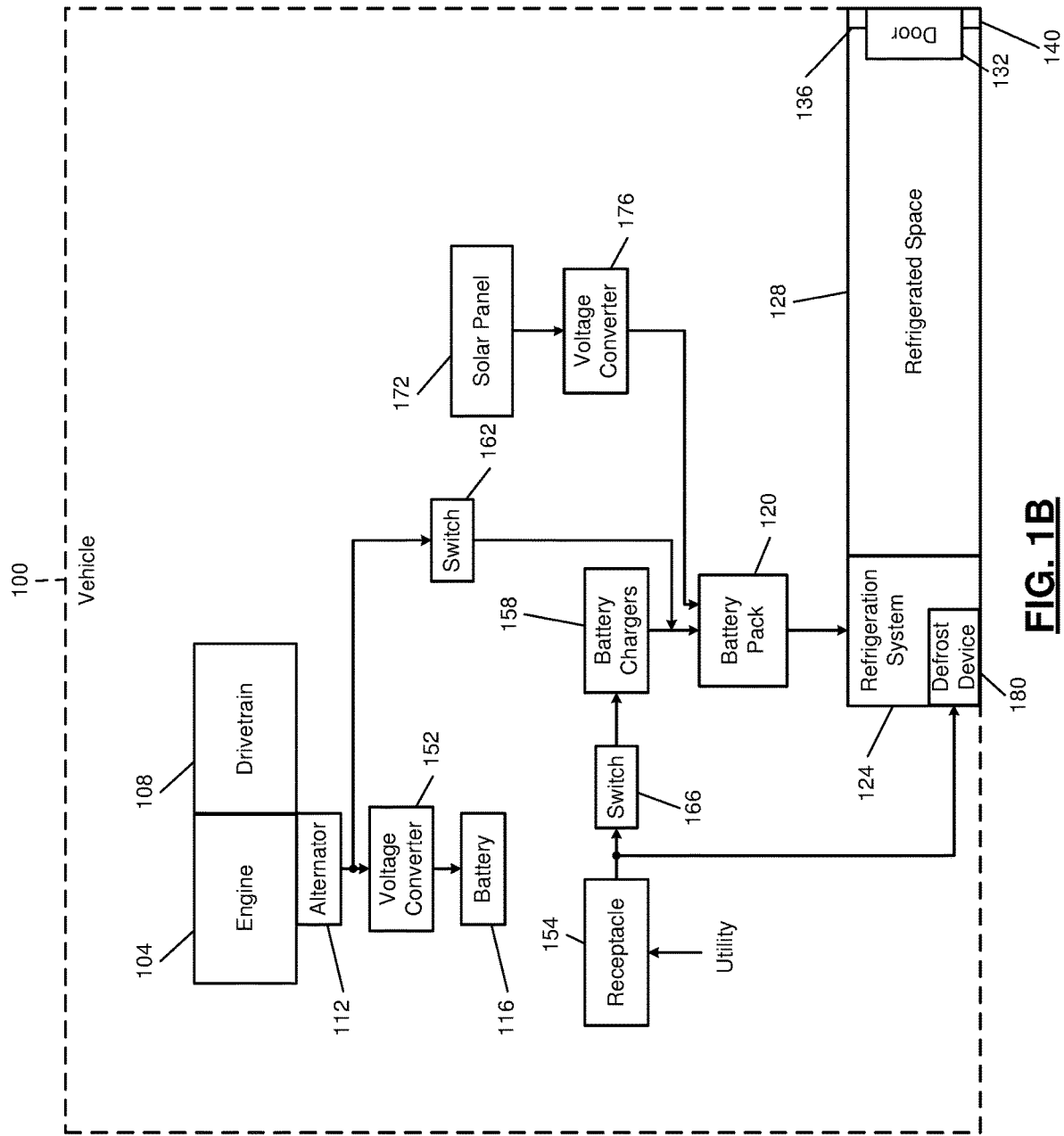

FIGS. 1A and 1B are functional block diagrams of example systems of a vehicle 100. The vehicle 100 includes an internal combustion engine 104 that combusts air and fuel within cylinders to generate propulsion torque for the vehicle 100. The engine 104 may combust, for example, gasoline, diesel fuel, natural gas, and/or one or more other types of fuel. The engine 104 outputs torque to a drivetrain 108. The drivetrain 108 transfers torque to two or more wheels of the vehicle. While the example of a wheeled vehicle is provided, the present application is not limited to vehicles having wheels and is also applicable to water and/or air based vehicles.

An alternator 112 is driven by the engine 104 and converts mechanical energy of the engine 104 into electrical energy to charge a battery 116. While the example of the alternator 112 is provided, a generator may be used in place of the alternator 112. The alternator 112 may be, for example, a 12 V alternator (e.g., in the example of FIG. 1A) or an 48 V alternator (e.g., in the example of FIG. 1B). As used herein, including the claims, the term "alternator" can refer to an alternator, a generator, or another device that converts mechanical energy from the engine 104 into electrical energy.

The vehicle 100 also includes a battery pack 120. For example only, the battery pack 120 may be a 48 Volt (V) direct current (DC) battery pack, although another suitable battery pack may be used. The battery pack 120 may include two or more individual batteries connected together or may include one battery. For example, in the case of a 48 V battery pack, the battery pack 120 may include four 12 V batteries connected in series. The batteries may be connected such that a lower voltage, such as 12 V, 24 V, and/or 36 V can also be obtained from one, two, or three of the batteries.

Figure 2A:
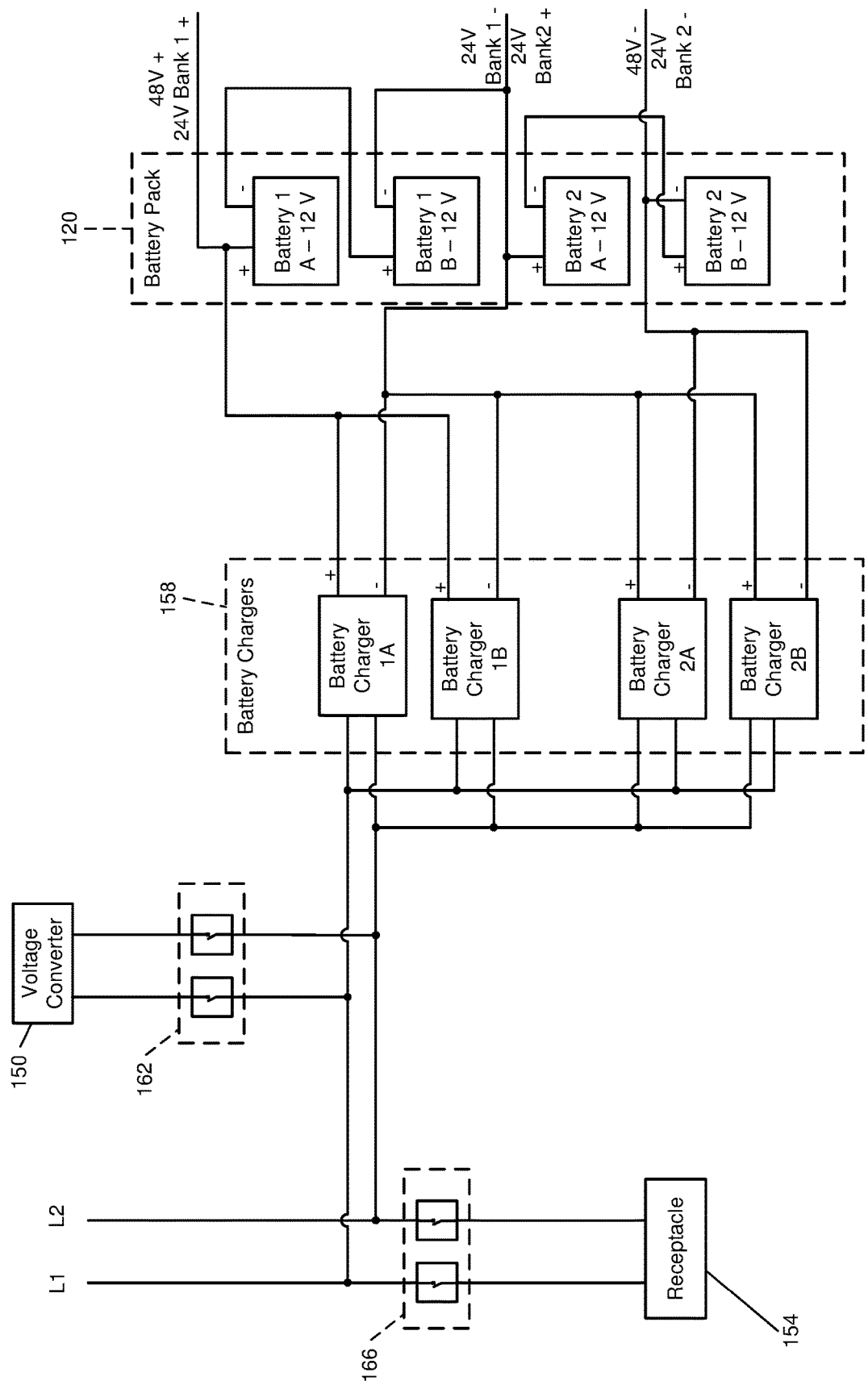
FIGS. 2A and 2B are schematics including a battery pack for a refrigeration system of a vehicle and example charging systems for charging the battery pack.
Figure 2B:
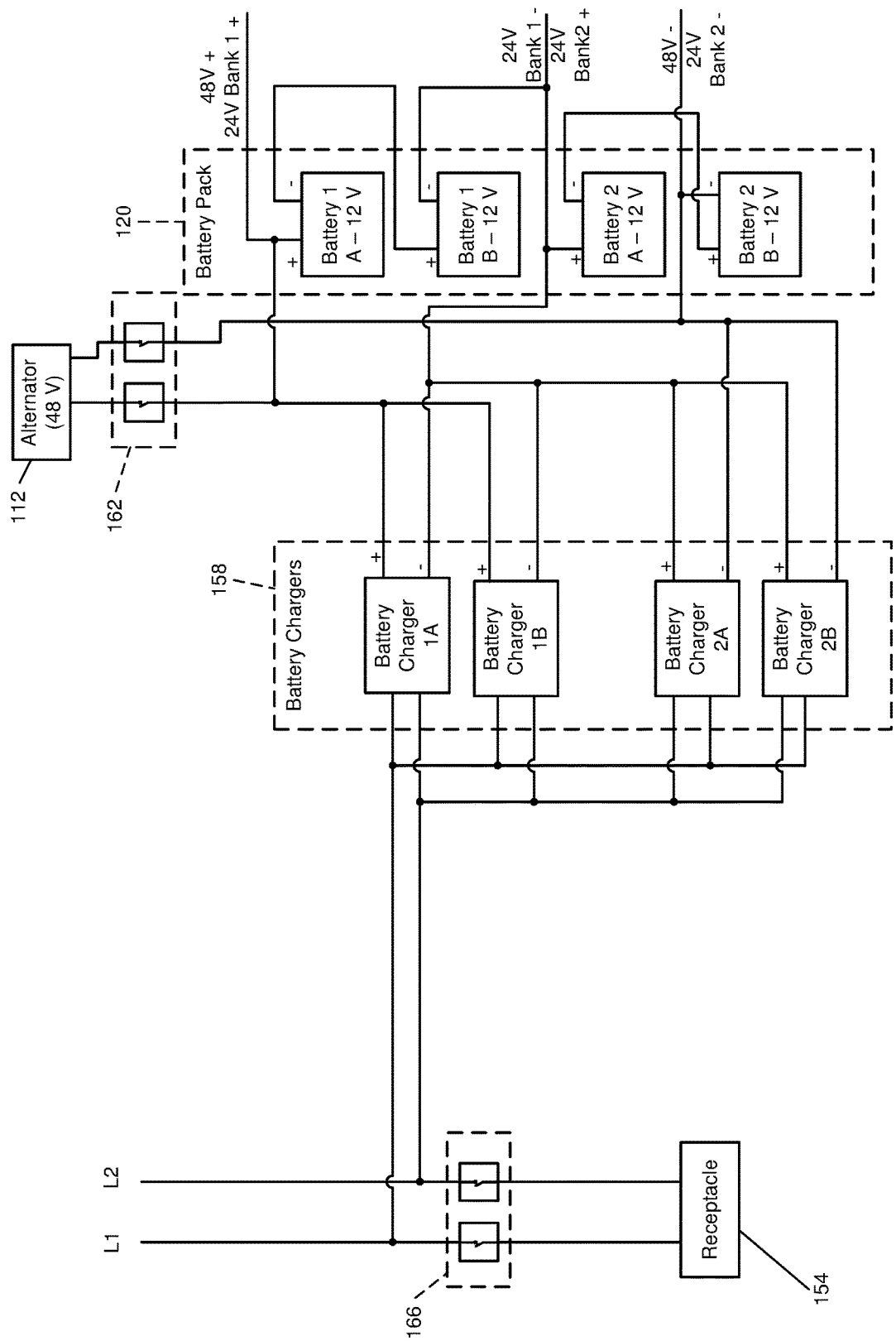

FIGS. 2A and 2B are schematics including examples of the battery pack 120 for a refrigeration system of a vehicle and example charging systems. In the examples of FIGS. 2A and 2B, the battery pack 120 includes four individual 12 V batteries connected in series. The batteries are arranged in two banks (A and B), each bank having two individual 12 V batteries (batteries 1 and 2) connected in series, to provide two 24 V reference potentials.

Referring back to FIGS. 1A and 1B, the battery pack 120 supplies power to a refrigeration system 124. The refrigeration system 124 cools a refrigerated space 128. The refrigerated space 128 may be one refrigerated space that is cooled based on a setpoint temperature. Alternatively, the refrigerated space 128 may be divided (e.g., physically) into multiple refrigerated spaces that may be cooled based on respective setpoint temperatures. For example, a first portion of the refrigerated space 128 may be cooled based on a first setpoint temperature (e.g., for refrigerated items) and a second portion of the refrigerated space 128 may be cooled based on a second setpoint temperature (e.g., for frozen items) that is less than the first setpoint temperature. One example of such a vehicle includes a truck for transporting perishable food items between locations. The refrigerated space(s) may be cooled with a closed loop control system based on temperature(s) within the refrigerated space(s) and the set point temperature(s), respectively.

The vehicle 100 includes a door 132 that provides access to the refrigerated space 128, for example, for loading and unloading of contents of the refrigerated space 128. While the example of one door is provided, the vehicle 100 may include two or more doors. Some vehicles include fourteen (14) or more doors.

An unlock actuator 136 and a lock actuator 140 may unlock and lock the door 132, respectively. The unlock and lock actuators 136 and 140 may, for example, slide a pin out of and into a receiver to lock and unlock the door 132, respectively. An unlock actuator and a lock actuator may be provided with each door to the refrigerated space in various implementations.

A control module (discussed further below) of the refrigeration system 124 may actuate the unlock actuator 136 to unlock the door 132 (and the other doors to the refrigerated space 128) in response to user input to unlock doors of a passenger cabin of the vehicle 100. The control module may actuate the lock actuator 140 to lock the door 132 (and the other doors to the refrigerated space 128) in response to user input to lock the doors of the passenger cabin of the vehicle 100. User input to lock and unlock the doors of the passenger cabin may be provided, for example, via a wireless key fob, a mobile device (e.g., cell phone, tablet, or other handheld device), a remote computer system, and/or one or more lock/unlock switches accessible from within the passenger cabin of the vehicle 100.

The battery pack 120 can be charged using multiple different power sources. For example, in the example of FIG. 1A, the vehicle 100 includes a voltage converter 150 that converts power output by the alternator 112 (e.g., 12 V) into power for charging the battery pack 120. The voltage converter 150 may convert the DC output of the alternator 112 into, for example, 240 V alternating current (AC). Since the alternator 112 is driven by rotation of the engine 104, the alternator 112 may be used to charge the battery pack 120 when the engine 104 is running.

While the alternator 112 is shown as providing power for charging both the battery 116 and the battery pack 120, a second alternator may be used to convert power of the engine 104 into electrical power for the battery pack 120. In that case, the alternator 112 may be used to charge the battery 116. In various implementations, the voltage converter 150 and a switch 162 may be omitted, and the engine 104 may not be used to charge the battery pack 120. The battery pack 120 may instead be charged via one or more other power sources, such as those discussed further below.

As another example, in the example of FIG. 1B, the alternator 112 may charge the battery pack 120. In this example, a voltage converter 152 may convert the power output by the alternator 112 (e.g., 48 V) into power for charging the battery 116. The voltage converter 152 may convert the DC output of the alternator 112 into, for example, 12 V for the battery 116. Alternatively, however, another alternator may be used to charge the battery 116.

The battery pack 120 can be charged using power from a utility received via a receptacle 154. The receptacle 154 is configured to receive AC or DC power. For example, the receptacle 154 may receive AC power from a utility via a power cord (e.g., an extension cord) connected between the receptacle 154 and a wall outlet or charger of a building. The receptacle 154 may be, for example, a single phase 110/120 or 208/240 V AC receptacle or a 3-phase 208/240 V AC receptacle. In various implementations, the vehicle 100 may include both a 110/120 V AC receptacle and a 208/240 V AC receptacle. While the example of the receptacle 154 receiving AC power is provided, the receptacle 154 may alternatively receive DC power from via a power cord. In various implementations, the vehicle 100 may include one or more AC receptacles and/or one or more DC receptacles. Power received from a utility via the receptacle 154 will be referred to as shore power.

The vehicle 100 also includes one or more battery chargers 158. The battery chargers 158 charge the batteries of the battery pack 120 using shore power received via the receptacle 154 (or power output by the voltage converter 150 in the examples of FIGS. 1A and 2A). When the receptacle 154 is connected to shore power, the switch 162 opens (or is opened) to isolate power from the alternator 112. While the switch 162 is shown illustratively as one switch, the switch 162 may include one, two, or more than two switching devices (e.g., normally closed or normally open relays). In the examples of FIGS. 2A and 2B, the switch 162 is illustrated as including two relays, one relay for each power line.

When the receptacle 154 is connected to shore power and the ignition system of the vehicle 100 is OFF, a switch 166 closes (or is closed) to relay power from the receptacle 154 to the battery chargers 158, and the battery chargers 158 charge the batteries using shore power. While the switch 166 is also shown illustratively as one switch, the switch 166 may include one, two, or more than two switching devices (e.g., normally closed or normally open relays). In the example of FIGS. 2A and 2B, the switch 166 is illustrated as including two relays, one relay for each power line.

When the ignition system of the vehicle 100 is ON, the switch 166 isolates the receptacle 154 from the battery chargers 158. In the examples of FIGS. 1A and 2A, when the ignition system of the vehicle 100 is ON (such that the engine 104 is running and the voltage converter 150 is outputting power to charge the battery pack 120), the switch 162 connects the voltage converter 150 to the battery chargers 158. The battery chargers 158 can then charge the batteries of the battery pack 120 using power output by the voltage converter 150. In the examples of FIGS. 1B and 2B, when the ignition system of the vehicle 100 is ON (such that the engine 104 is running and the alternator 112 is outputting power), the switch 162 connects the alternator 112 to the battery pack 120 so the alternator 112 charges the battery pack 120.

One battery charger may be provided for each battery of the battery pack 120. Two or more battery chargers may be connected in series and/or parallel in various implementations. Each battery charger may convert input power (e.g., shore power or power output by the voltage converter 150) into, for example, 24 V, 40 amp (A) DC power for charging. For example only, the battery chargers 158 may include one model SEC-2440 charger, manufactured by Samlex America Inc., of Burnaby, BC, Canada. In the examples of FIGS. 2A and 2B, two groups of two 24 V, 40 A battery chargers are connected to provide a 48 V, 80 A output for battery charging. While the example of battery chargers having a 24 V, 40 A output is provided, battery chargers having another output may be used, such as one 12 V charger connected to each battery. The battery chargers 158 may also monitor the individual batteries and control application of power to the respective batteries to prevent overcharging.

The vehicle 100 may optionally include a solar panel 172. The solar panel 172 converts solar energy into electrical energy. While the example of one solar panel is provided, multiple solar panels may be used. A voltage converter 176 converts power output by the solar panel 172 and charges the battery pack 120.

As discussed further below, the refrigeration system 124 includes one or more eutectic plates. The eutectic plate(s) are cooled when the vehicle 100 is connected to shore power. When the vehicle 100 is later disconnected from shore power (e.g., for delivery of contents of the refrigerated space 128), the eutectic plate(s) can be used to cool the refrigerated space 128 via power from the battery pack 120. The eutectic plate(s) can also be cooled by the refrigeration system 124 when the vehicle 100 is disconnected from shore power.

By charging the battery pack 120 when the vehicle 100 is connected to shore power (and/or via the solar panel 172), use of the engine 104 to generate power to operate the refrigeration system 124 when the vehicle 100 is disconnected from shore power may be minimized or eliminated. This may decrease fuel consumption (and increase fuel efficiency) of the engine 104 and the vehicle 100.

A defrost device 180 may be used to defrost the eutectic plate(s) when the vehicle 100 is connected to shore power. One example of the defrost device 180 includes a resistive heater that warms air circulated over, around, and/or through the eutectic plate(s), such as by one or more fans. Another example of the defrost device 180 includes a resistive heater that warms a fluid (e.g., a glycol solution) that is circulated over, around, and/or through the eutectic plate(s), such as by one or more pumps. In this way, heat from the warm air or warm fluid defrosts the eutectic plate(s).

Figure 3:
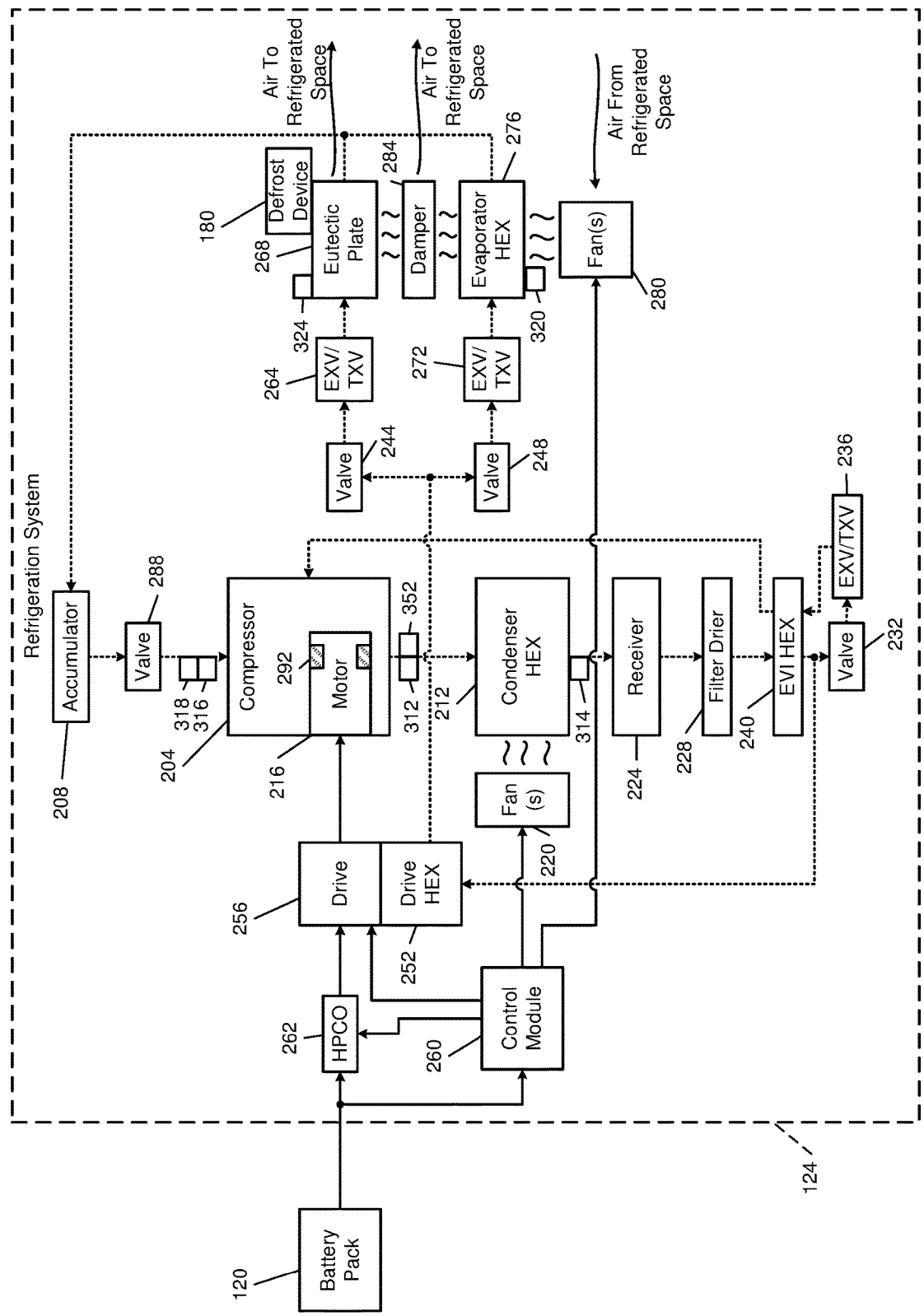
FIG. 3 is a functional block diagram of an example implementation of a refrigeration system of a vehicle including a eutectic plate and an evaporator system.

FIG. 3 includes a functional block diagram of an example implementation of the refrigeration system 124. In the example of FIG. 3, dotted lines indicate refrigerant flow, while solid lines indicate electrical connections. In various implementations, some, all, or none of the components of the refrigeration system 124 may be located within the refrigerated space 128.

A compressor 204 receives refrigerant vapor from an accumulator 208 via a suction line of the compressor 204. The accumulator 208 collects liquid refrigerant to minimize liquid refrigerant flow to the compressor 204. The compressor 204 compresses the refrigerant and provides pressurized refrigerant in vapor form to a condenser heat exchanger (HEX) 212. The compressor 204 includes an electric motor 216 that drives a pump to compress the refrigerant. For example only, the compressor 204 may include a scroll compressor, a reciprocating compressor, or another type of refrigerant compressor. The electric motor 216 may include, for example, an induction motor, a permanent magnet motor (brushed or brushless), or another suitable type of electric motor. In various implementations, the electric motor 216 may be a brushless permanent magnet (BPM) motor, for example, due to BPM motors being more efficient than other types of electric motors.

All or a portion of the pressurized refrigerant is converted into liquid form within the condenser HEX 212. The condenser HEX 212 transfers heat away from the refrigerant, thereby cooling the refrigerant. When the refrigerant vapor is cooled to a temperature that is less than a saturation temperature of the refrigerant, the refrigerant transitions into liquid (or liquefied) form. One or more condenser fans 220 may be implemented to increase airflow over, around, and/or through the condenser HEX 212 and increase the rate of heat transfer away from the refrigerant.

Refrigerant from the condenser HEX 212 is delivered to a receiver 224. The receiver 224 may be implemented to store excess refrigerant. In various implementations, the receiver 224 may be omitted. A filter drier 228 may be implemented to remove moister and debris from the refrigerant. In various implementations, the filter drier 228 may be omitted.

When an enhanced vapor injection (EVI) valve 232 is open, a portion of the refrigerant may be expanded to vapor form by an expansion valve 236 and provided to an EVI HEX 240. The EVI valve 232 may be, for example, a solenoid valve or another suitable type of valve.

The EVI HEX 240 may be a counter flow plate HEX and may superheat the vapor refrigerant from the EVI valve 232. Vapor refrigerant from the EVI HEX 240 may be provided to the compressor 204, such as at a midpoint within a compression chamber of the compressor 204. EVI may be performed, for example, to increase capacity and increase efficiency of the refrigeration system 124. The EVI valve 232 may include a thermostatic expansion valve (TXV) or an electronic expansion valve (EXV).

The refrigerant not flowing through the EVI valve 232 is circulated to a plate control valve 244 and an evaporator control valve 248. The plate control valve 244 may be, for example, a solenoid valve or another suitable type of valve. The evaporator control valve 248 may be, for example, a solenoid valve or another suitable type of valve.

Before flowing to the plate control valve 244 and the evaporator control valve 248, the refrigerant may flow through a drive HEX 252. The drive HEX 252 draws heat away from a drive 256 and transfers heat to refrigerant flowing through the drive HEX 252. While the example of the drive HEX 252 being liquid (refrigerant) cooled is provided, the drive 256 may additionally or alternatively be air cooled. Air cooling may be active (e.g., by a fan) or passive (e.g., by conduction and convection).

The drive 256 controls application of power to the motor 216 from the battery pack 120. For example, the drive 256 may control application of power to the motor 216 based on a speed command from a control module 260. Based on the speed command, the drive 256 may generate three-phase AC power (e.g., 208/240 V AC) and apply the three-phase AC power to the motor 216. The drive 256 may set one or more characteristics of the three-phase AC power based on the speed command, such as frequency, voltage, and/or current. For example only, the drive 256 may be a variable frequency drive (VFD). In various implementations, one or more electromagnetic interference (EMI) filters may be implemented between the battery pack 120 and the drive 256.

The control module 260 may set the speed command to a plurality of different possible speeds for variable speed operation of the motor 216 and the compressor 204. The control module 260 and the drive 256 may communicate, for example, using RS485 Modbus or another suitable type of communication including, but not limited to, controller area network (CAN) Bus or analog or analog signaling (e.g., 0-10V signals).

A high pressure cut off (HPCO) 262 may be implemented to disconnect the drive 256 from power and disable the motor 216 when the pressure of refrigerant output by the compressor 204 exceeds a predetermined pressure. The control module 260 may also control operation of the compressor 204 based on a comparison of the pressure of refrigerant output by the compressor 204. For example, the control module 260 may shut down or reduce the speed of the compressor 204 when the pressure of refrigerant output by the compressor is less than a second predetermined pressure that is less than or equal to the predetermined pressure used by the HPCO 262.

When the plate control valve 244 is open, refrigerant may be expanded to vapor form by an expansion valve 264 and provided to eutectic plate(s) 268. The vapor refrigerant cools the eutectic plate(s) 268 and a solution within the eutectic plate(s) 268. For example only, the solution may be a solution including one or more salts. The solution may have a freezing point temperature of, for example, approximately 12 degrees Fahrenheit or another suitable freezing point temperature. The solution of the eutectic plate(s) 268 may be selected, for example, based on the items typically cooled within the refrigerated space 128. The expansion valve 264 may include a TXV or may be an EXV.

The eutectic plate(s) 268 are located within the refrigerated space 128 and cools the refrigerated space 128. By freezing the solution within the eutectic plate(s) 268, the eutectic plate(s) 268 can be used to cool the refrigerated space for a period of time after the freezing, such as while the vehicle 100 is transporting items within the refrigerated space 128.

When the evaporator control valve 248 is open, refrigerant may be expanded to vapor form by an expansion valve 272 and provided to an evaporator HEX 276. The expansion valve 272 may include a TXV or may be an EXV. Like the eutectic plate(s) 268, the evaporator HEX 276 cools the refrigerated space 128. More specifically, the vapor refrigerant within the evaporator HEX 276 transfers heat away (i.e., absorbs heat) from air within the refrigerated space 128.

One or more evaporator fans 280 may draw air from the refrigerated space 128. The evaporator fan(s) 280 may increase airflow over, around, and/or through the evaporator HEX 276 and the eutectic plate(s) 268 to increase the rate of heat transfer away from (i.e., cooling of) the air within the refrigerated space 128. A damper door 284 may be implemented to allow or block airflow from the evaporator fan(s) 280 to the eutectic plate(s) 268. For example, when the damper door 284 is open, the evaporator fan(s) 280 may circulate air past the evaporator HEX 276 and the eutectic plate(s) 268. When the damper door 284 is closed, the damper door 284 may block airflow from the evaporator fan(s) 280 to the eutectic plate(s) 268, and the evaporator fan(s) 280 may circulate air over, around, and/or through the evaporator HEX 276. While the example of the damper door 284 is provided, another suitable actuator may be used to allow/prevent airflow from the evaporator fan(s) 280 to the eutectic plate(s) 268. Alternatively, one or more fans may be provided with the evaporator HEX 276, and one or more fans may be provided with the eutectic plate(s) 268. Refrigerant flowing out of the eutectic plate(s) 268 and the evaporator HEX 276 may flow back to the accumulator 208. Air cooled by the evaporator HEX 276 and the eutectic plate(s) 268 flows to the refrigerated space to cool the refrigerated space 128. While separate cooled air paths are illustrated in the example of FIG. 3, air flowing out of the eutectic plate(s) 268 may be combined with air flowing out of the evaporator HEX 276 before the cooled air is output to cool the refrigerated space 128. Curved lines in FIG. 3 are illustrative of air flow.

The refrigeration system 124 may also include a compressor pressure regulator (CPR) valve 288 that regulates pressure of refrigerant input to the compressor 204 via the suction line. For example, the CPR valve 288 may be closed to limit pressure into the compressor 204 during startup of the compressor 204. The CPR valve 288 may be an electronically controlled valve (e.g., a stepper motor or solenoid valve), a mechanical valve, or another suitable type of valve. In various implementations, the CPR valve 288 may be omitted.

Figure 4A:
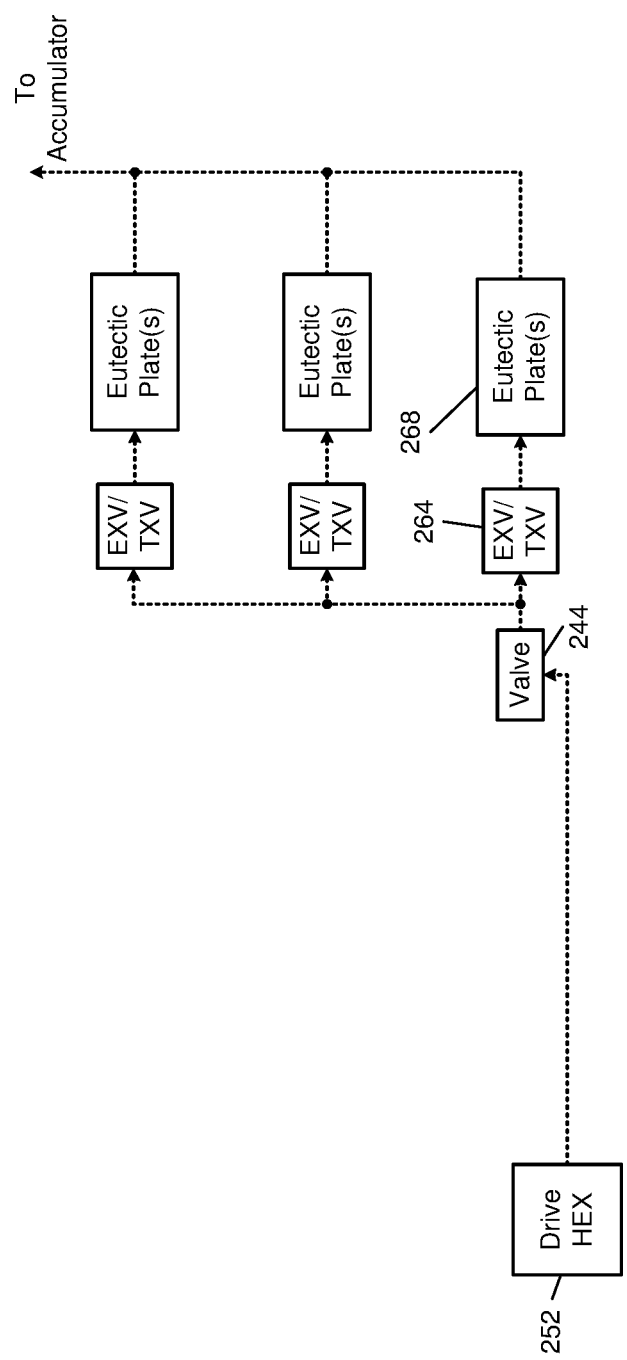
FIG. 4A includes a functional block diagram of a portion of an example refrigeration system including multiple eutectic plates.

The example of one eutectic plate and one evaporator HEX is provided in FIG. 3. However, the refrigeration system 124 may include more than one eutectic plate, such as two, three, four, five, six, or more eutectic plates. One expansion valve may be provided for each eutectic plate. FIG. 4A includes a functional block diagram of a portion of an example refrigeration system including multiple eutectic plates.

Figure 4B:
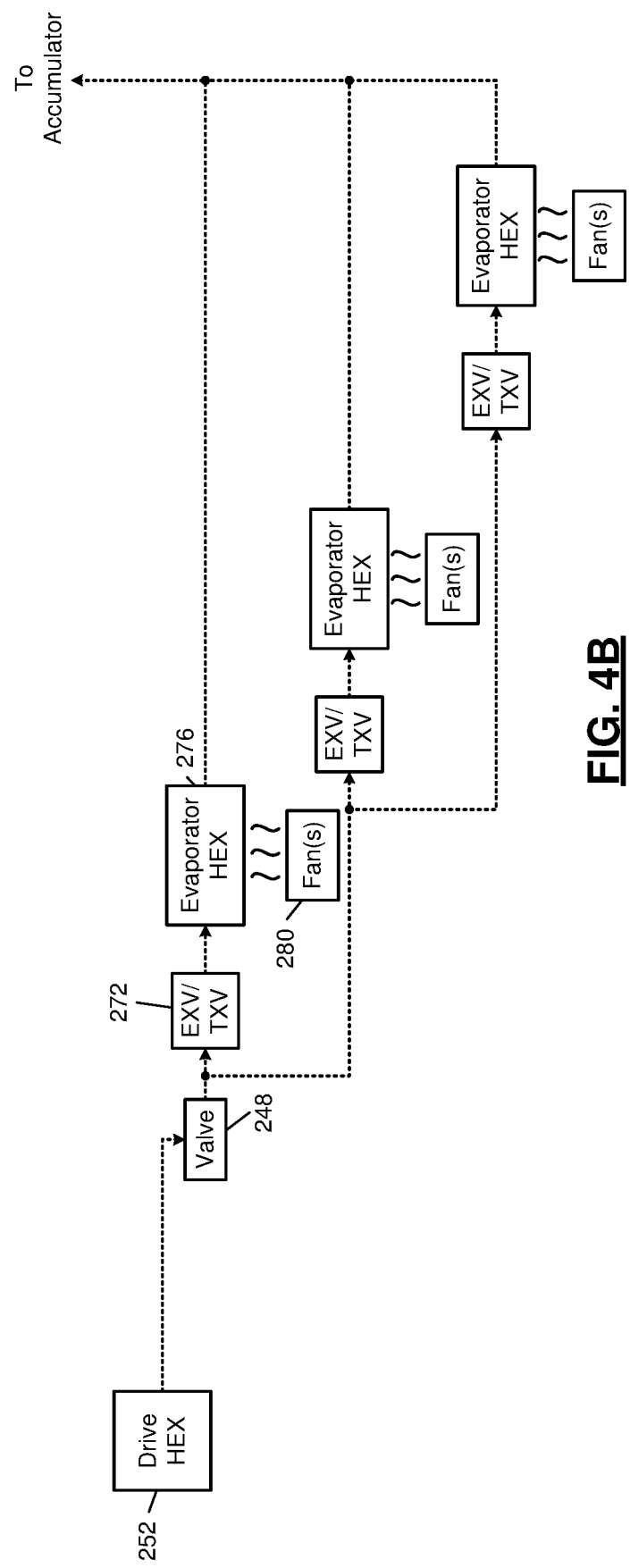
FIG. 4B includes a functional block diagram of a portion of an example refrigeration system including multiple evaporator systems.

Additionally or alternatively to having one or multiple eutectic plates, the refrigeration system 124 may include more than one evaporator HEX, such as two, three, four, five, six, or more evaporator HEXs. For example, different evaporator HEXs may be provided for different sections of the refrigerated space 128. One expansion valve and one or more evaporator fans may be provided for each evaporator HEX. FIG. 4B includes a functional block diagram of a portion of an example refrigeration system including three evaporator HEXes.

Some vehicles may include two or more refrigerated spaces, but only include an evaporator (or multiple) and a eutectic plate (or multiple) in one of the refrigerated spaces. A damper door or another suitable actuator may be provided to open and close the one refrigerated space having the evaporator and eutectic plate(s) to and from one or more other refrigerated spaces not having an evaporator or eutectic plate(s) (i.e., not having any evaporators and not having any eutectic plates). The control module 260 may control opening and closing of such a damper door or actuator, for example, based on maintaining a temperature within the other refrigerated space based on a setpoint for that other refrigerated space.

In some examples, the refrigeration system 124 may implement stator heating of the compressor 204. For example, the motor 216 of the compressor 204 may include a stator (shown schematically at 292), which is a non-moving part of the motor 216. When the compressor 204 is on, power (e.g., current) is provided to the stator 292 magnetically drives a rotor of the motor 216, which in turn drives a crankshaft. The crankshaft may, in turn, drive a compression mechanism of the compressor 204. However, when current is provided to the stator 292 while the compressor 204 is off, the stator 292 generates heat. In this manner, the stator 292 may function as a heater for lubricants within the compressor 204 and cause evaporation of liquid refrigerant accumulated within the compressor 204. An example of stator heating is described in more detail in U.S. Pat. No. 8,734,125, assigned to Emerson Climate Technologies, Inc., which is incorporated herein in its entirety.

Figure 5:
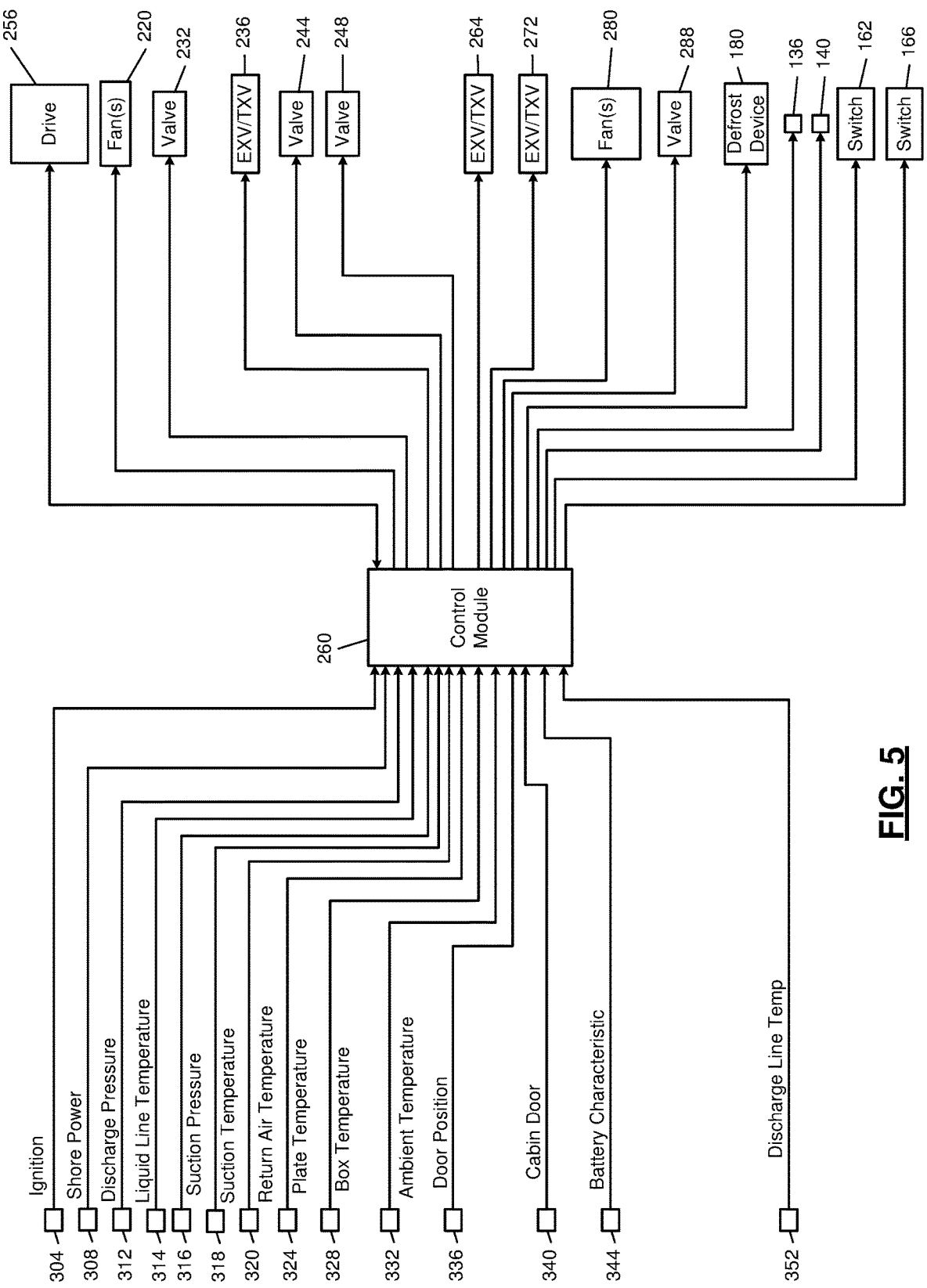
FIG. 5 includes a functional block diagram of an example system including a control module, sensors of the vehicle, and actuators of the vehicle.

FIG. 5 includes a functional block diagram of an example system including the control module 260, various sensors of the vehicle 100, and various actuators of the vehicle 100. The control module 260 receives various measured parameters and indications from sensors of the vehicle 100. The control module 260 controls actuators of the vehicle 100. As an example, the control module 260 may be an iPRO series control module (e.g., 100 series, 200 series, 4 DIN series, 10 DIN series) by Dixell S.r.l., located in Pieve d'Alpago (BL) Italy. One example is an iPRO IPG115D control module, however, the control module 260 may be another suitable type of control module.

An ignition sensor 304 indicates whether an ignition system of the vehicle 100 is ON or OFF. A driver may turn the ignition system of the vehicle 100 ON and start the engine 104, for example, by actuating an ignition key, button, or switch. The ignition system being ON may indicate that that a refrigeration system (discussed further below) is being or can be powered via a charging system powered by the engine 104. A driver may turn the ignition system of the vehicle 100 OFF and shut down the engine 104, for example, by actuating the ignition key, button, or switch.

A shore power sensor 308 indicates whether the vehicle 100 is receiving shore power via the receptacle 154.

A discharge pressure sensor 312 measures a pressure of refrigerant output by the compressor 204 (e.g., in the discharge line). The pressure of refrigerant output by the compressor 204 can be referred to as discharge pressure.

A liquid line temperature sensor 314 measures a temperature of liquid refrigerant output from the condenser HEX 212 (e.g., in the liquid line). The temperature of refrigerant output by the condenser HEX 212 can be referred to as liquid line temperature. The control module 260 may determine a subcooling value based on the liquid line temperature. The control module may determine a refrigerant charge level based on the subcooling value. While one example location of the liquid line temperature sensor 314 is shown, the liquid line temperature sensor 314 may be located at another location where liquid refrigerant is present in the refrigerant path from the condenser HEX 212 to the evaporator HEX 276 (and the eutectic plate(s) 268).

A suction pressure sensor 316 measures a pressure of refrigerant input to the compressor 204 (e.g., in the suction line). The pressure of refrigerant input to the compressor 204 can be referred to as suction pressure.

A suction temperature sensor 318 measures a temperature of refrigerant input to the compressor 204 (e.g., in the suction line). The temperature of refrigerant input to the compressor 204 can be referred to as suction temperature. The control module 260 may determine a superheat value at the compressor 204. The control module 260 may detect and/or predict the presence of a liquid floodback condition based on the superheat value.

A return air temperature sensor 320 measures a temperature of air input to the evaporator HEX 276. The temperature of air input to the evaporator HEX 276 can be referred to as return air temperature (RAT). One return air temperature sensor may be provided for each set of one or more evaporator HEX and one or more eutectic plates.

A plate temperature sensor 324 measures a temperature of the eutectic plate(s) 268. The temperature of the eutectic plate(s) 268 can be referred to as a plate temperature.

A box temperature sensor 328 measures a temperature within the refrigerated space 128. The temperature within the refrigerated space 128 can be referred to as a box temperature. One or more box temperature sensors may be provided and measure a box temperature within each different portion of the refrigerated space 128.

An ambient temperature sensor 332 measures a temperature of ambient air at the location of the vehicle 100. This temperature can be referred to as ambient air temperature. In various implementations, the control module 260 may receive the ambient air temperature from an engine control module (ECM) that controls actuators of the engine 104.

A door position sensor 336 indicates whether the door 132 is closed or open. An indication that the door 132 is open may mean that the door 132 is at least partially open (i.e., not closed), while an indication that the door 132 is closed may mean that the door 132 is fully closed. One or more door position sensors may be provided for each door to the refrigerated space 128.

A cabin door sensor 340 indicates whether the doors of the passenger cabin have been commanded to be locked or unlocked. A driver may command unlocking and locking of the doors of the passenger cabin, for example, via a wireless key fob. As discussed above, the control module 260 may actuate the unlock actuator 136 to unlock the door(s) to the refrigerated space 128 when the driver commands unlocking of the doors passenger cabin. The control module 260 may actuate the lock actuator 140 to lock the door(s) to the refrigerated space 128 when the driver commands locking of the doors of the passenger cabin.

A battery sensor 344 measures a characteristic of a battery of the battery pack 120, such as voltage, current, and/or temperature. In various implementations, a voltage sensor, a current sensor, and/or a temperature sensor may be provided with each battery of the battery pack 120.

A discharge line temperature sensor 352 measures a temperature of refrigerant output by the compressor 204 (e.g., in the discharge line). The temperature of refrigerant output by the compressor 204 can be referred to as discharge line temperature (DLT). In various implementations, the discharge line temperature sensor 352 may provide the DLT to the drive 256, and the drive 256 may communicate the DLT to the control module 260.

Sensors described herein may be analog sensors or digital sensors. In the case of an analog sensor, the analog signal generated by the sensor may be sampled and digitized (e.g., by the control module 260, the drive 256, or another control module) to generate digital values, respectively, corresponding to the measurements of the sensor. In various implementations, the vehicle 100 may include a combination of analog sensors and digital sensors. For example, the ignition sensor 304, the shore power sensor 308, the door position sensor 336 may be digital sensors. The discharge pressure sensor 312, the suction pressure sensor 316, the return air temperature sensor 320, the plate temperature sensor 324, the box temperature sensor 328, the ambient temperature sensor 332, the battery sensor 344, and the discharge line temperature sensor 352 may be analog sensors.

As discussed further below, the control module 260 controls actuators of the refrigeration system 124 based on various measured parameters, indications, setpoints, and other parameters.

For example, the control module 260 may control the motor 216 of the compressor 204 via the drive 256. The control module 260 may control the condenser fan(s) 220. The condenser fan(s) 220 may be fixed speed, and the control module 260 may control the condenser fan(s) 220 to be either ON or OFF. Alternatively, the condenser fan(s) 220 may be variable speed, and the control module 260 may determine a speed setpoint for the condenser fan(s) 220 and control the condenser fan(s) 220 based on the speed setpoint, for example, by applying a pulse width modulation (PWM) signal to the condenser fan(s) 220.

The control module 260 may also control the EVI valve 232. For example, the control module 260 may control the EVI valve 232 to be open to enable EVI or closed to disable EVI. In the example of the expansion valve 236 being an EXV, the control module 260 may control opening of the expansion valve 236.

The control module 260 may also control the plate control valve 244. For example, the control module 260 may control the plate control valve 244 to be open to enable refrigerant flow through the eutectic plate(s) 268 or closed to disable refrigerant flow through the eutectic plate(s) 268. In the example of the expansion valve 264 being an EXV, the control module 260 may control opening of the expansion valve 264.

The control module 260 may also control the evaporator control valve 248. For example, the control module 260 may control the evaporator control valve 248 to be open to enable refrigerant flow through the evaporator HEX 276 or closed to disable refrigerant flow through the evaporator HEX 276. In the example of the expansion valve 272 being an EXV, the control module 260 may control opening of the expansion valve 272.

The control module 260 may receive a signal that indicates whether the HPCO 262 has tripped (open circuited). The control module 260 may take one or more remedial actions when the HPCO 262 has tripped, such as closing one, more than one, or all of the above mentioned valves and/or turning OFF one, more than one, or all of the above mentioned fans. The control module 260 may generate an output signal indicating that the HPCO 262 has tripped when the discharge pressure of the compressor 204 is greater than a predetermined pressure. The control module 260 may enable operation of the refrigeration system 124 after the HPCO 262 closes in response to the discharge pressure falling below than the predetermined pressure. In various implementations, the control module 260 may also require that one or more operating conditions be satisfied before enabling operation of the refrigeration system 124 after the HPCO 262 closes.

The control module may control the evaporator fan(s) 280. The evaporator fan(s) 280 may be fixed speed, and the control module 260 may control the evaporator fan(s) 280 to be either ON or OFF. Alternatively, the evaporator fan(s) 280 may be variable speed, and the control module 260 may determine a speed setpoint for the evaporator fan(s) 280 and control the evaporator fan(s) 280 based on the speed setpoint, for example, by applying a PWM signal to the evaporator fan(s) 280.

In cases where the CPR valve 288 is used and the CPR valve 288 is an electronic CPR valve, the control module 260 may also control the CPR valve 288. For example, the control module 260 may actuate the CPR valve 288 to limit the suction pressure during startup and later open the CPR valve 288.

The control module 260 may also control operation of the defrost device 180 by activating or deactivating the defrost device 180.

The control module 260 may also control the switches 162 and 166. For example, the control module 260 may switch the switch 162 from the closed state to the open state and switch the switch 166 from the open state to the closed state when the ignition system of the vehicle 100 is OFF and shore power is connected to the vehicle 100 via the receptacle 154. The control module 260 may switch the switch 162 from the open state to the closed state and switch the switch 166 from the closed state to the open state when the ignition system of the vehicle 100 is ON. This may be the case regardless of whether shore power is or is not connected to the vehicle 100. The switches 162 and 166 may be active switches, for example, so the control module 260 can ensure that both switches 162 and 166 are not both in the closed state at the same time.

In various implementations, the switches 162 and 166 may be passive devices configured to have opposite open and closed states based on whether shore power is connected to the vehicle 100. For example, the switch 166 may transition to the closed state and the switch 162 may transition to the open state when shore power is connected to the vehicle 100. The switch 166 may transition to the open state and the switch 162 may transition to the closed state when shore power is not connected to the vehicle 100.

Figure 6:
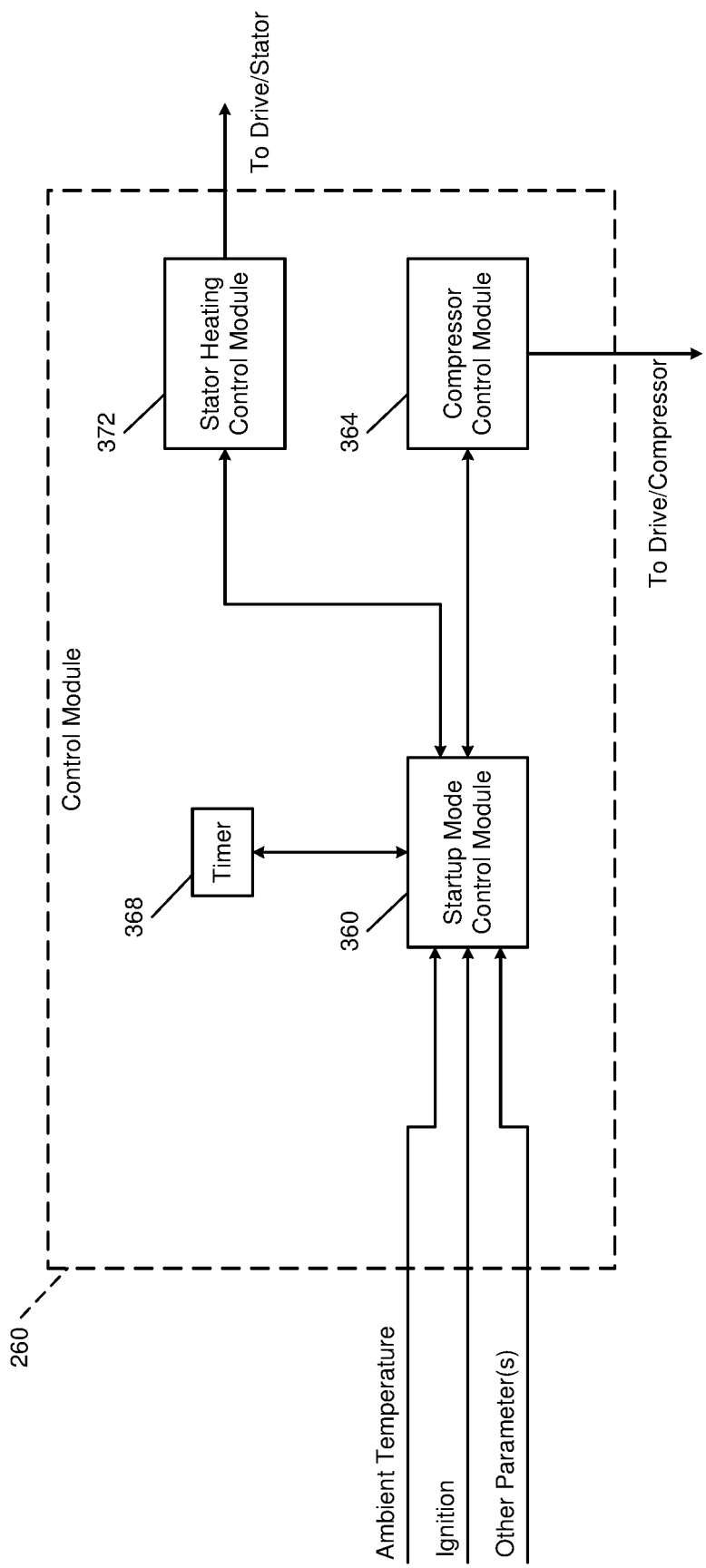
FIG. 6 includes a functional block diagram of an example control module implementing flooded startup control.

Referring now to FIG. 6, a functional block diagram of an example of the control module 260 implementing the flooded start logic according to the principles of the present disclosure is shown. For example, the control module 260 includes a startup mode control module 360 and a compressor control module 364. The startup mode control module 360 monitors one or more conditions of the vehicle 100 and/or the refrigeration system 124 as described below in more detail (e.g., compressor off time, ambient temperature, etc.) to determine whether a flooded startup situation is likely to occur. For example, the startup mode control module 360 determines whether a flooded startup is likely in response to the vehicle 100 and the refrigeration system 124 being powered on (e.g., in response to a signal indicating the ignition system has been turned ON), and/or in response to any command to turn the compressor 204 on. The startup mode control module 360 initiates a normal startup (i.e., a normal startup mode) or a flooded startup (i.e., a flooded startup mode) accordingly. For example, the startup mode control module 360 provides an indication of the selected startup mode to the compressor control module 364.

The compressor control module 364 outputs one or more control signals to the drive 256, the HPCO 262, etc. to control operation of the compressor 204 according to the selected startup mode. For example, in the flooded startup mode, the compressor 204 may be operated at a reduced speed (e.g., a minimum compressor speed associated with the compressor 204) for a predetermined period (e.g., 2 minutes) prior to transitioning to the normal startup mode. Conversely, in the normal startup mode, the compressor 204 is operated according to capacity and runtime requirements of the refrigeration system 124.

In one example, the startup mode control module 360 determines whether a flooded startup is likely (i.e., detects flooded startup conditions) based on a compressor off time. The compressor off time corresponds to, for example only, a continuous amount of time the compressor 204 has been off. For example, if the compressor off time is less than a predetermined off time threshold (e.g., 4 hours), the startup mode control module 360 selects the normal startup mode. Conversely, if the compressor off time is greater than the off time threshold, the startup mode control module selects the flooded startup mode. The off time threshold may be selected to be greater than a maximum amount of time the compressor 204 is off during typical daytime operation (i.e., while the vehicle 100 is in use, ignition is ON, etc.).

The startup mode control module 360 may monitor the compressor off time and compare the compressor off time to the off time threshold at vehicle startup. For example, the startup mode control module 360 may initiate a timer 368 each time the compressor 204 is turned off and reset the time 368 each time the compressor 204 is turned on. Accordingly, the timer 368 indicates the compressor off time. At vehicle startup, the startup mode control module 360 compares the value of the timer 368 to the off time threshold to determine whether to select the normal startup mode or the flooded startup mode.

In another example, the startup mode control module 360 detects flooded startup conditions based on ambient temperature. For example, if the ambient temperature is greater than a predetermined temperature threshold), the startup mode control module 360 selects the normal startup mode. Conversely, if the ambient temperature is less than the temperature threshold, the startup mode control module 360 selects the flooded startup mode. In one example, the temperature threshold is selected to correspond to a temperature below which flooded startup conditions are more likely to occur (e.g., 50 degrees Fahrenheit). In another example, the temperature threshold may be selected to be sufficiently high to ensure that the flooded startup mode is selected in most situations (e.g., 100 degrees Fahrenheit).

In another example, the startup mode control module 360 detects flooded startup conditions based on one or more other measured parameters during startup. For example, the startup mode control module 360 may initially select the normal startup mode, and transition to the flooded start mode based on measured parameters indicative of flooded start conditions. Example parameters that may be indicative of flooded start conditions include parameters indicative of excessive load on the compressor 204 and may include, but are not limited to, discharge pressure, discharge line temperature, suction pressure, operating parameters of the drive 256 and/or motor 216, etc.

In still another example, the startup mode control module 360 may detect flooded startup conditions based on a combination of two or more parameters (e.g., compressor off time and ambient temperature). For example only, a compressor off time threshold may be a first value (e.g., 4 hours) for ambient temperatures in a first temperature range (e.g., greater than 100 degrees Fahrenheit), a second value (e.g., 3 hours) for ambient temperatures in a second temperature range (e.g., between 50 and 100 degrees Fahrenheit), and a third value (e.g., 2 hours) for ambient temperatures in a third temperature range (e.g., less than 50 degrees Fahrenheit). In one example, the startup mode control module 360 stores a lookup table correlating various parameters such as compressor off time, ambient temperature, etc.

Similarly, compressor speed during the flooded startup mode and the duration of the flooded startup mode may be fixed (e.g., according to calibrated or modeled values) or may be variable based on one or more conditions at vehicle startup. For example, compressor speed during the flooded startup mode may be set to a minimum speed that is sufficient to maintain operation of the compressor under maximum load, or may be set to a first amount greater than the minimum compressor speed for a compressor off time (or ambient temperature) in a first range, a second amount greater than the minimum compressor speed for a compressor off time in a second range, etc. Compressor run time during the flooded startup mode may be varied in a similar manner (e.g., 1 minute for a compressor off time in a first range, 2 minutes for a compressor off time in a second range, 3 minutes for a compressor off time in a third range, etc.).

In some examples, the startup mode control module 360 may selectively implement stator heating as described above based on detection of flooded startup conditions, independently and/or in conjunction with control of the compressor speed during the flooded startup mode. For example, the control module 260 may further include a stator heating control module 372.

In one example, in response to selecting the flooded startup mode, the startup mode control module 360 controls the stator heating control module 372 to provide current to the stator 292 prior to turning on the compressor 204. The current may be provided to the stator 292 for a predetermined stator heating period to heat the compressor 204. After the predetermined stator heating period, the startup mode control module 360 turns on the compressor 204. In one example, the startup mode control module 360 starts the compressor 204 in the normal startup mode after the stator heating period. In another example, the startup mode control module 360 starts the compressor 204 in the flooded startup mode after the stator heating period. In still another example, the startup mode control module 360 starts the compressor 204 in the flooded startup mode during the stator heating period.

A duration of the stator heating period may be varied according to parameters such as ambient temperature, compressor off time, etc. In some examples, stator heating may be performed prior to receiving a request to turn on the compressor 204. Stator heating may be performed periodically and/or conditionally while the compressor 204 is off. In one example, if stator heating is performed less than a predetermined threshold period prior to a request to turn on the compressor 204 (e.g., within the previous 24 hours), the startup mode control module 360 may select the normal startup mode regardless of whether other conditions (e.g., compressor off time, ambient temperature, etc. as described above) indicate that a flooded startup conditions are likely. In another example, the startup mode control module 360 may reset the timer 368 in response to stator heating being performed during the compressor off time.

Figure 7:
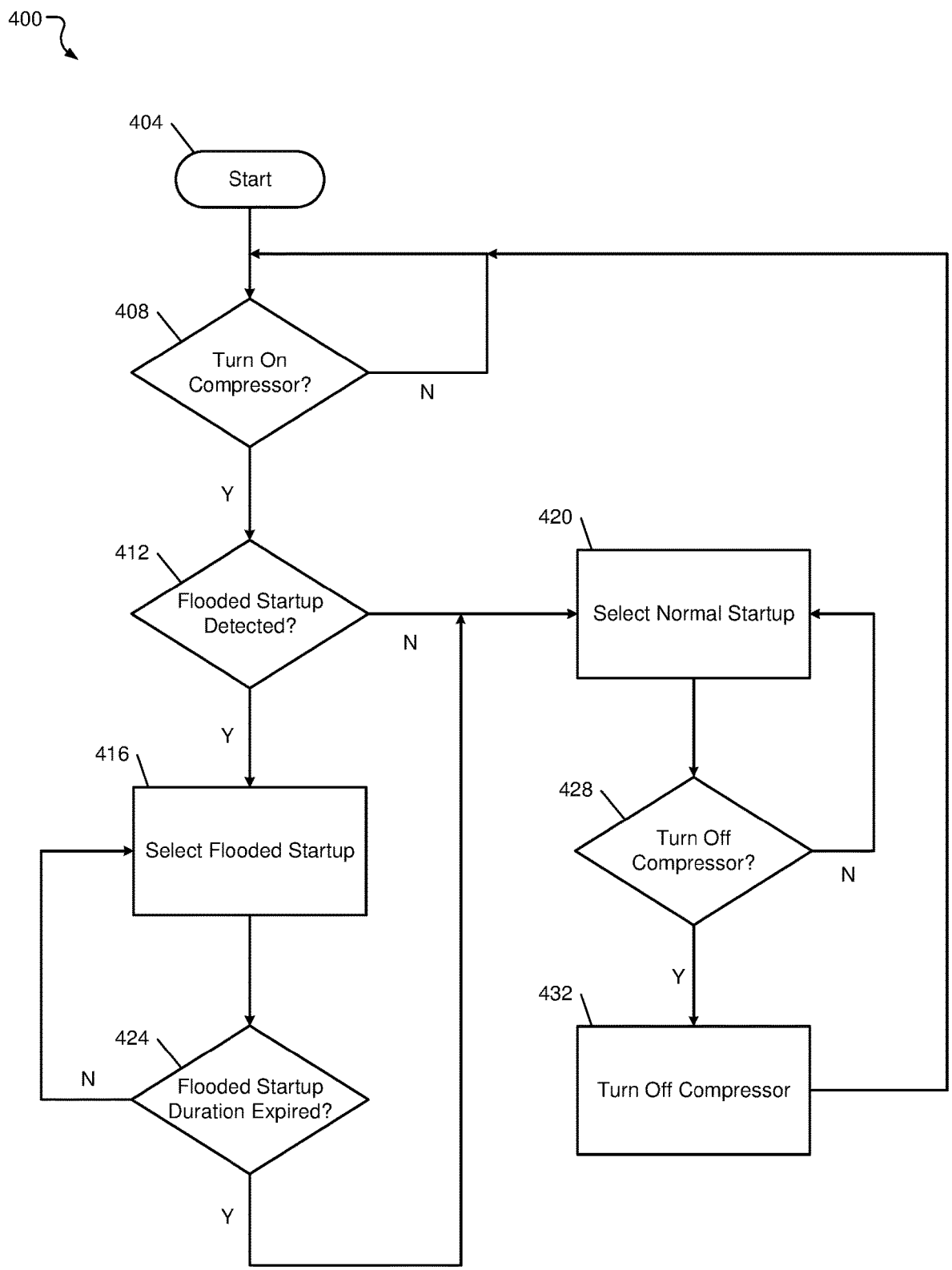
FIG. 7 includes a flow diagram illustrating steps of an example flooded startup method.

Referring now to FIG. 7, an example method 400 for selectively operating a compressor in a flooded startup mode begins at 404 (e.g., during a compressor off time, prior to receiving a request to turn on the compressor 204). At 408, the method 400 (e.g., the startup mode control module 360) determines whether to turn on the compressor 204 (e.g., in response to the vehicle 100 and/or the refrigeration system 124 being turned on, a command to turn on the compressor 204 subsequent to a period that the compressor 204 was off, etc.). If true, the method 400 continues to 412. If false, the method 400 continues to 408.

At 412, the method 400 detects whether flooded startup conditions are likely. For example, the startup mode control module 360 detects flooded startup conditions based on compressor off time, ambient temperature, whether stator heating was performed within a predetermined period prior to receiving a request to turn on the compressor 204, etc. If true, the method 400 continues to 416. If false, the method 400 continues to 420. At 416, the method 400 selects the flooded startup mode and operates the compressor 204 accordingly. For example, the startup mode control module 360 selects the flooded startup mode and provides an indication to the compressor control module 364 that the flooded startup mode was selected, and the compressor control module 364 controls the compressor 204 according to operating parameters (e.g., compressor speed) associated with the flooded startup mode. In some examples, the startup mode control module 360 implements stator heating prior to turning on the compressor 204 at 416. For example, the startup mode control module 360 may perform stator heating for a predetermined stator heating period and turn on the compressor in either the flooded startup mode or the normal startup mode subsequent to the stator heating period.

At 424, the method 400 determines whether the compressor 204 has been operating in the flooded startup mode for a predetermined period (i.e., whether a duration of the flooded startup mode has expired). If true, the method 400 continues to 420. If false, the method 400 continues to 416.

At 420, the method 400 selects the normal startup mode. For example, the startup mode control module 360 provides an indication to the compressor control module 364 that the normal startup mode was selected, and the compressor control module 364 controls the compressor 364 according to operating parameters associated with the normal startup mode. At 428, the method 400 determines whether to turn off the compressor 204. For example, the compressor control module 364 may determine that a capacity need of the refrigeration system 124 has been met, a maximum run time of the compressor 204 has been met, etc. If true, the method 400 continues to 432. If false, the method 400 continues to 420. At 432, the method 400 (e.g., the compressor control module 364) turns off the compressor 204 and continues to 408.

Figure 8:
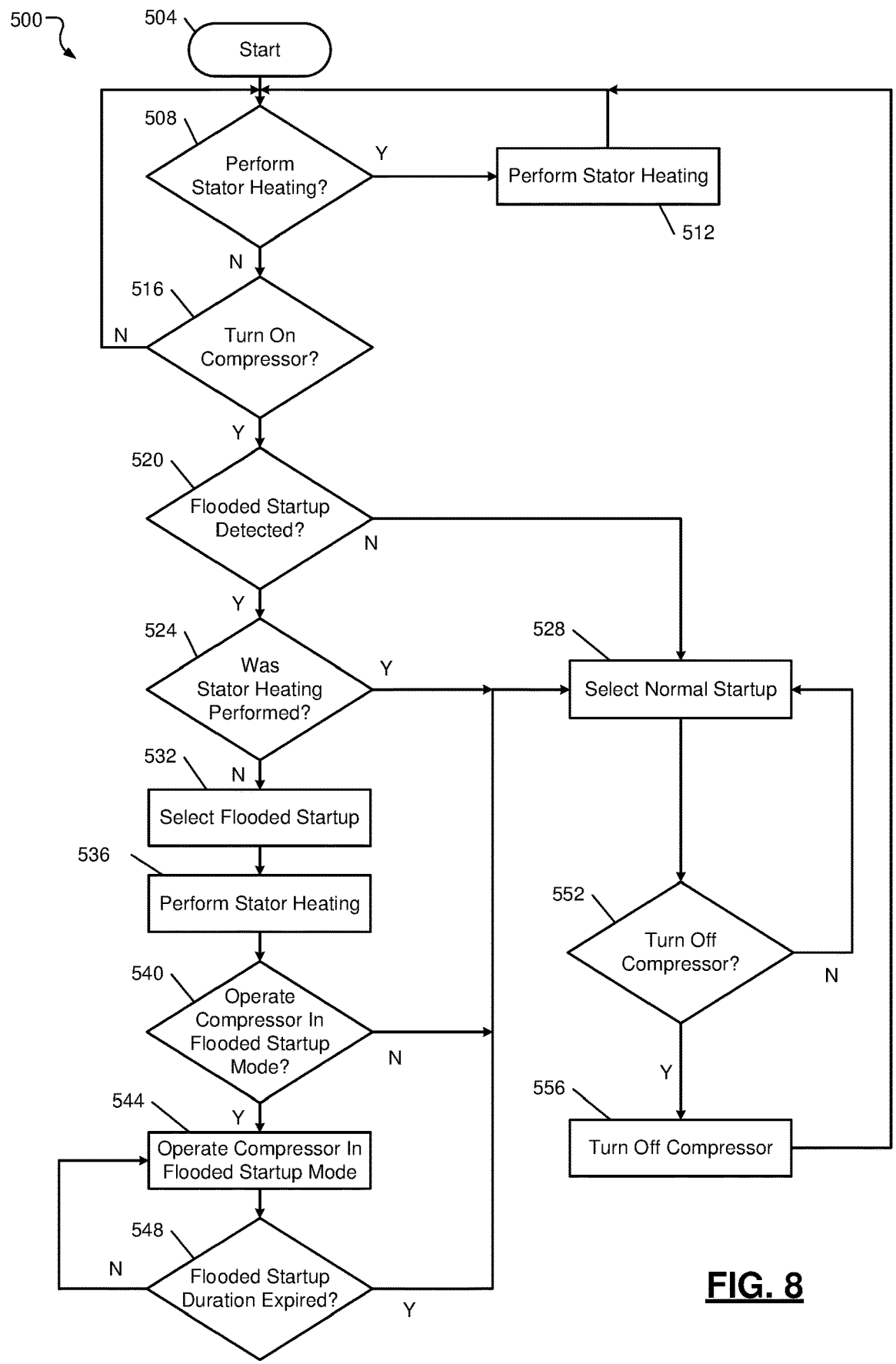
FIG. 8 includes a flow diagram illustrating steps of another example flooded startup method.

Referring now to FIG. 8, another example method 500 for selectively operating a compressor in a flooded startup mode begins at 504 (e.g., during a compressor off time, prior to receiving a request to turn on the compressor 204). At 508, the method 500 determines whether to perform stator heating. For example, the control module 260, the startup mode control module 360, etc. may selectively (e.g., periodically) perform stator heating during a compressor off time. Performing stator heating during compressor off time may evaporate refrigerant accumulated in the compressor 204, thereby potentially obviating the need to operate in the flooded startup mode when the compressor 204 is subsequently turned on. If true, the method 500 performs stator heating at 512. If false, the method 500 continues to 516. At 516, the method 500 (e.g., the startup mode control module 360) determines whether to turn on the compressor 204 (e.g., in response to the vehicle 100 and/or the refrigeration system 124 being turned on, a command to turn on the compressor 204 subsequent to a period that the compressor 204 was off, etc.). If true, the method 500 continues to 520. If false, the method 500 continues to 508.

At 520, the method 500 detects whether flooded startup conditions are likely. For example, the startup mode control module 360 detects flooded startup conditions based on compressor off time, ambient temperature, etc. If true, the method 500 continues to 524. If false, the method 500 continues to 528. At 524, the method 500 (e.g., the startup mode control module 360) determines whether stator heating was performed within a predetermined period prior to receiving the request to turn on the compressor 204 at 516. If true, the method 500 continues to 528. If false, the method 500 continues to 532. At 532, the method 500 selects the flooded startup mode. At 536, the method 500 (e.g., the startup mode control module 360 and the stator heating control module 372) performs stator heating. For example, the method 500 performs stator heating for a predetermined stator heating period. The stator heating period may be selected according to ambient temperature, a compressor off time, a time elapsed since a previous time that stator heating was performed, etc.

At 540, the method 500 determines whether to operate the compressor 204 in the flooded startup mode. For example, the startup mode control module 360 may determine that continuing in the flooded startup mode is unnecessary subsequent to the performing stator heating (e.g., based on ambient temperature compressor off time, etc.) If true, the method 500 continues to 544. If false, the method 500 continues to 528. At 544, the method 500 and operates the compressor 204 in the flooded startup mode. For example, the startup mode control module 360 provides an indication to the compressor control module 364 that the flooded startup mode was selected, and the compressor control module 364 controls the compressor 204 according to operating parameters (e.g., compressor speed) associated with the flooded startup mode.

At 548, the method 500 determines whether the compressor 204 has been operating in the flooded startup mode for a predetermined period (i.e., whether a duration of the flooded startup mode has expired). If true, the method 500 continues to 528. If false, the method 500 continues to 544.

At 528, the method 400 selects the normal startup mode. For example, the startup mode control module 360 provides an indication to the compressor control module 364 that the normal startup mode was selected, and the compressor control module 364 controls the compressor 364 according to operating parameters associated with the normal startup mode. At 552, the method 500 determines whether to turn off the compressor 204. For example, the compressor control module 364 may determine that a capacity need of the refrigeration system 124 has been met, a maximum run time of the compressor 204 has been met, etc. If true, the method 500 continues to 556. If false, the method 500 continues to 528. At 556, the method 500 (e.g., the compressor control module 364) turns off the compressor 204 and continues to 508.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "control module" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A control module for a refrigeration system, the control module comprising:
   a startup mode control module that
      receives a request to turn on a compressor of the refrigeration system,
      receives an off time of the compressor and an ambient temperature during the off time,
      determines whether the off time of the compressor and the ambient temperature during the off time of the compressor indicate that the compressor is in a flooded condition based on a determination of whether stator heating was performed during the off time of the compressor, and
      selects, based on the determination, between a normal startup mode and a flooded startup mode; and
   a compressor control module that
      operates the compressor in the normal startup mode in response to the startup mode control module selecting the normal startup mode,
      operates the compressor in the flooded startup mode in response to the startup mode control module selecting the flooded startup mode,
      transitions from the flooded startup mode to the normal startup mode after a predetermined period associated with operating in the flooded startup mode, and
      operates the compressor at a first speed in the normal startup mode and operates the compressor at a second speed less than the first speed in the flooded startup mode.

2. The control module of claim 1, wherein the compressor is a variable speed compressor.

3. The control module of claim 1, wherein the first speed is selected according to a capacity need of the refrigeration system and the second speed is selected according to a minimum speed of the compressor sufficient to operate the compressor under maximum load.

4. The control module of claim 1, wherein the second speed is selected according to at least one of the off time and the ambient temperature.

5. The control module of claim 1, wherein the startup mode control module selects the flooded startup mode when the off time is greater than an off time threshold.

6. The control module of claim 1, wherein the startup mode control module selects the flooded startup mode when the ambient temperature is less than a temperature threshold.

7. A vehicle comprising the control module of claim 1.

8. The control module of claim 1, wherein the startup mode control module selectively performs stator heating prior to operating the compressor, wherein performing the stator heating includes providing power to a stator of a motor of the compressor when the compressor is off.

9. The control module of claim 8, wherein selectively performing the stator heating includes performing the stator heating prior to receiving a request to turn on the compressor.

10. The control module of claim 8, wherein selectively performing the stator heating includes performing the stator heating in response to the startup mode control module selecting the flooded startup mode.

11. The control module of claim 1, wherein:
the startup mode control module selects the normal startup mode based on a determination that the off time and the ambient temperature do not indicate that the compressor is in the flooded condition.

12. A control module for a refrigeration system, the control module comprising:
a startup mode control module that
receives a request to turn on a compressor of the refrigeration system,
receives an off time of the compressor and an ambient temperature during the off time,
determines whether the off time and the ambient temperature during the off time indicate that the compressor is in a flooded condition, and
selects, based on the determination, between a normal startup mode and a flooded startup mode; and
a compressor control module that
operates the compressor in the normal startup mode in response to the startup mode control module selecting the normal startup mode,
operates the compressor in the flooded startup mode in response to the startup mode control module selecting the flooded startup mode,
transitions from the flooded startup mode to the normal startup mode after a predetermined period associated with operating in the flooded startup mode, and
operates the compressor at a first speed in the normal startup mode and operates the compressor at a second speed less than the first speed in the flooded startup mode, wherein the startup mode control module
determines whether stator heating was performed during the off time and within a predetermined period prior to receiving the request to turn on the compressor, and
selects the normal startup mode in response to a determination that the stator heating was performed during the off time and within the predetermined period regardless of whether the off time and the ambient temperature indicate that the compressor is in the flooded condition.

13. The control module of claim 12, wherein:
the startup mode control module selects the flooded startup mode in response to (i) a determination that the off time and the ambient temperature indicate that the compressor is in the flooded condition and (ii) a determination that the stator heating was not performed during the off time and within the predetermined period.

14. A refrigeration system, comprising:
a timer that indicates an off time of an compressor of the refrigeration system; and
a startup mode control module that
receives a request to turn on the compressor of the refrigeration system,
receives the off time of the compressor and an ambient temperature during the off time,
determines whether the off time of the compressor and the ambient temperature indicate that the compressor is in a flooded condition,
determines whether stator heating was performed during the off time and within a predetermined period prior to receiving the request to turn on the compressor, and
selects between a normal startup mode and a flooded startup mode based on the determination of whether the stator heating was performed during the off time and within the predetermined period regardless of whether the off time and the ambient temperature indicate that the compressor is in the flooded condition.

15. The refrigeration system of claim 14, wherein:
the startup mode control module selects the flooded startup mode in response to (i) a determination that the off time and the ambient temperature indicate that the compressor is in the flooded condition and (ii) a determination that the stator heating was not performed during the off time and within the predetermined period.

* * * * *